US011743865B2

(12) United States Patent
Abotabl et al.

(10) Patent No.: US 11,743,865 B2
(45) Date of Patent: Aug. 29, 2023

(54) SCHEDULED ENTITY BEHAVIOR IN FULL-DUPLEX SLOT FORMAT

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Wanshi Chen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/308,548

(22) Filed: May 5, 2021

(65) Prior Publication Data

US 2021/0400637 A1 Dec. 23, 2021

Related U.S. Application Data

(60) Provisional application No. 63/041,774, filed on Jun. 19, 2020.

(51) Int. Cl.
*H04W 56/00* (2009.01)
*H04W 72/02* (2009.01)
(Continued)

(52) U.S. Cl.
CPC ............... *H04W 72/02* (2013.01); *H04L 5/14* (2013.01); *H04W 72/0446* (2013.01);
(Continued)

(58) Field of Classification Search
CPC ............. H04W 72/02; H04W 72/0446; H04W 72/1257; H04W 72/1263; H04W 72/1289; H04L 5/14
(Continued)

(56) References Cited

U.S. PATENT DOCUMENTS

2014/0198680 A1 7/2014 Siomina et al.
2016/0233904 A1* 8/2016 Wu ....................... H04L 5/1469
(Continued)

OTHER PUBLICATIONS

International Search Report and Written Opinion—PCT/US2021/031158—ISA/EPO—Aug. 2, 2021.

*Primary Examiner* — Sai Ming Chan
(74) *Attorney, Agent, or Firm* — Arun Swain; Loza & Loza LLP

(57) ABSTRACT

Aspects of the disclosure relate to obtaining a duplex mode of a scheduled entity, selecting a downlink-uplink (DU) slot interpretation to be applied by the scheduled entity to a slot including a DU symbol based on the duplex mode of the scheduled entity, and transmitting the DU slot interpretation to the scheduled entity. The DU symbol may be configured to include a downlink transmission and an uplink transmission within a same carrier bandwidth. Other aspects relate to receiving a message, indicating that the slot is formatted with a DU symbol, selecting a DU slot interpretation to be applied to the slot including the DU symbol based on a duplex mode of the scheduled entity, and applying the DU slot interpretation to the slot. Other aspects, examples, and features are also claimed and described.

30 Claims, 15 Drawing Sheets

(51) Int. Cl.
   *H04W 72/1263*   (2023.01)
   *H04W 72/0446*   (2023.01)
   *H04L 5/14*      (2006.01)
   *H04W 72/23*     (2023.01)
   *H04W 72/50*     (2023.01)

(52) U.S. Cl.
   CPC ....... *H04W 72/1263* (2013.01); *H04W 72/23* (2023.01); *H04W 72/535* (2023.01)

(58) Field of Classification Search
   USPC .......................................................... 370/329
   See application file for complete search history.

(56) References Cited

U.S. PATENT DOCUMENTS

| | | | |
|---|---|---|---|
| 2017/0163403 A1* | 6/2017 | Karjalainen | H04L 5/1438 |
| 2018/0309513 A1* | 10/2018 | Kim | H04B 7/2643 |
| 2020/0170010 A1 | 5/2020 | Luo et al. | |
| 2020/0322080 A1* | 10/2020 | Ma | H04L 5/0053 |
| 2020/0374157 A1* | 11/2020 | Chen | H04L 25/0226 |
| 2021/0219329 A1* | 7/2021 | Zhou | H04W 72/1273 |

* cited by examiner

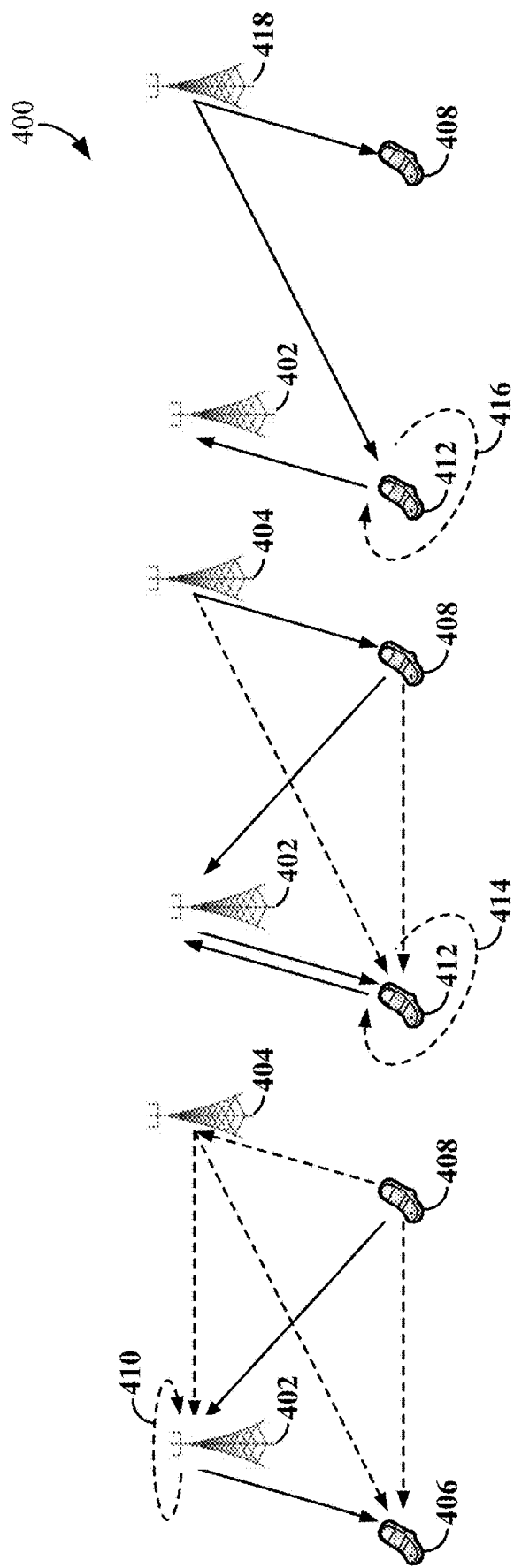

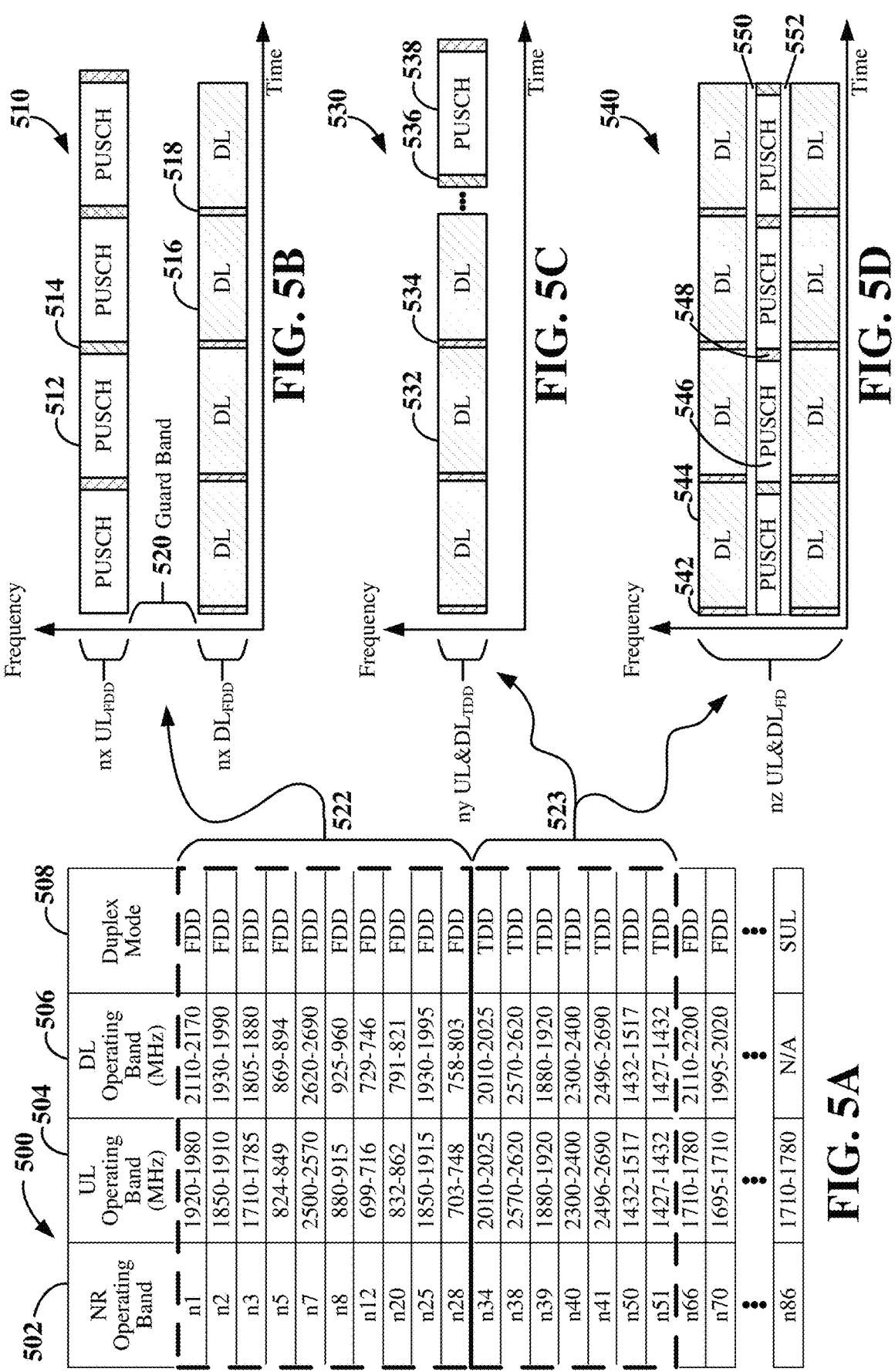

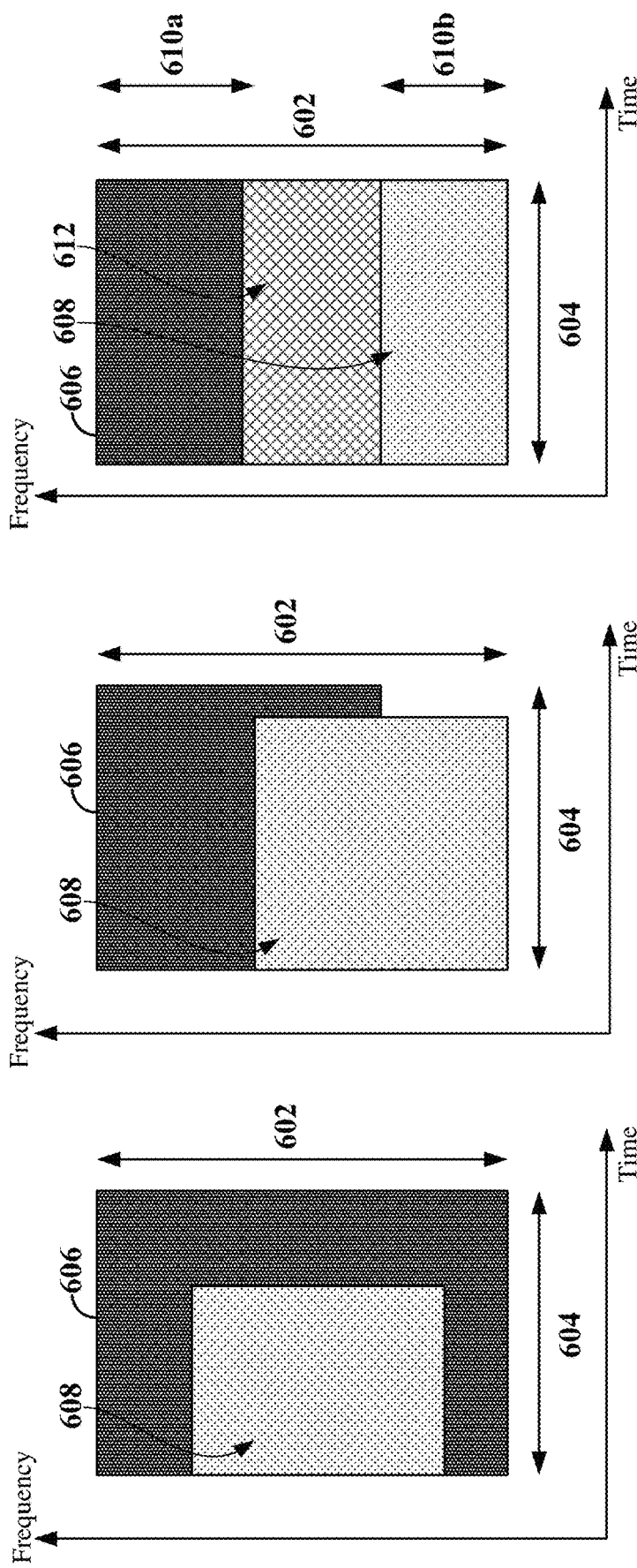

SCHEDULED ENTITY BEHAVIOR IN FULL-DUPLEX SLOT FORMAT

CROSS-REFERENCE TO RELATED APPLICATIONS

This application for patent claims priority to and the benefit of provisional patent application No. 63/041,774 entitled "Scheduled Entity Behavior In Full Duplex Slot Format" filed in the United States Patent and Trademark Office on Jun. 19, 2020, the entire content of which is incorporated herein by reference as if fully set forth below in its entirety and for all applicable purposes.

TECHNICAL FIELD

The technology discussed below relates generally to wireless communication systems, and more particularly, to time domain and user equipment behavior in full-duplex slot format.

INTRODUCTION

Wireless communications are conveyed in uplink (UL) transmissions, from a scheduled entity, such as a user equipment (UE) or other wireless communications device, to a scheduling entity, such as a base station, and in downlink (DL) transmissions from the scheduling entity to the scheduled entity. Frequency division duplex (FDD) communications allow simultaneous two-way communication by separating the frequencies used for uplink (UL) and downlink (DL) transmissions. Separating the frequencies used for UL and DL transmissions allows the UL transmissions to be isolated from the DL transmissions in the frequency domain. The isolation in the frequency domain reduces interference from a transmitter at a receiver during a full-duplex communications exchange. Time division duplex (TDD) communications allow non-simultaneous two-way communications by employing one set of frequencies for both UL and DL transmissions in the frequency domain while designating some time slots for UL transmission and other time slots for DL transmission. In TDD half-duplex communications, UL and DL transmissions occur at the same frequencies and are isolated from one another in time.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication is disclosed. The method includes, at a scheduling entity, obtaining a duplex mode of a scheduled entity in wireless communication with the scheduling entity, selecting a downlink-uplink (DU) slot interpretation to be applied by the scheduled entity to a slot including a DU symbol based on the duplex mode of the scheduled entity, and transmitting the DU slot interpretation to the scheduled entity, where the DU symbol is configured to include a downlink transmission and an uplink transmission within a same carrier bandwidth.

In another example, a scheduling entity in a wireless communication network is disclosed. The scheduling entity includes a wireless transceiver, a memory, and a processor communicatively coupled to the wireless transceiver and the memory. In the example, the processor and the memory are configured to obtain a duplex mode of a scheduled entity in wireless communication with the scheduling entity, select a downlink-uplink (DU) slot interpretation to be applied by the scheduled entity to a slot including a DU symbol based on the duplex mode of the scheduled entity, and transmit the DU slot interpretation to the scheduled entity, where the DU symbol is configured to include a downlink transmission and an uplink transmission within a same carrier bandwidth.

According to another aspect, a method of wireless communication is disclosed. The method includes, at a scheduling entity, receiving a message, indicating that a slot is formatted with a downlink-uplink (DU) symbol reserved for a downlink transmission and an uplink transmission, selecting a DU slot interpretation to be applied to the slot including the DU symbol based on a duplex mode of the scheduled entity, and applying the DU slot interpretation to the slot, wherein the DU symbol is configured to include a downlink transmission and an uplink transmission within a same carrier bandwidth.

In another example, a scheduling entity in a wireless communication network is disclosed. The scheduling entity includes a wireless transceiver, a memory, and a processor communicatively coupled to the wireless transceiver and the memory. In the example, the processor and the memory are configured to receive a message, indicating that a slot is formatted with a downlink-uplink (DU) symbol reserved for a downlink transmission and an uplink transmission, select a DU slot interpretation to be applied to the slot including the DU symbol based on a duplex mode of the scheduled entity, and apply the DU slot interpretation to the slot wherein the DU symbol is configured to include a downlink transmission and an uplink transmission within a same carrier bandwidth.

These and other aspects will become more fully understood upon a review of the detailed description, which follows. Other aspects, features, and examples will become apparent to those of ordinary skill in the art upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIGS. 4A, 4B, and 4C are schematic illustrations of a wireless communication network and sources of interference for a full-duplex gNB, a half-duplex user equipment (UE), a first full-duplex UE, and a second full-duplex UE, according to some aspects of the disclosure.

FIG. 5A is a table depicting a plurality of new radio (NR) operating bands (e.g., radio channels), UL operating band frequencies, DL operating band frequencies, and the duplex mode associated with each of the NR operating bands according to some aspects of the disclosure.

FIG. 5B is a diagram illustrating an FDD FD scheme according to some aspects of the disclosure.

FIG. 5C is a diagram illustrating a TDD HD scheme according to some aspects of the disclosure.

FIG. 5D is a diagram illustrating an SBFD scheme according to some aspects of the disclosure.

FIGS. 6A-6C illustrate examples of full-duplex communication in unpaired spectrum.

DETAILED DESCRIPTION

Figure 1:
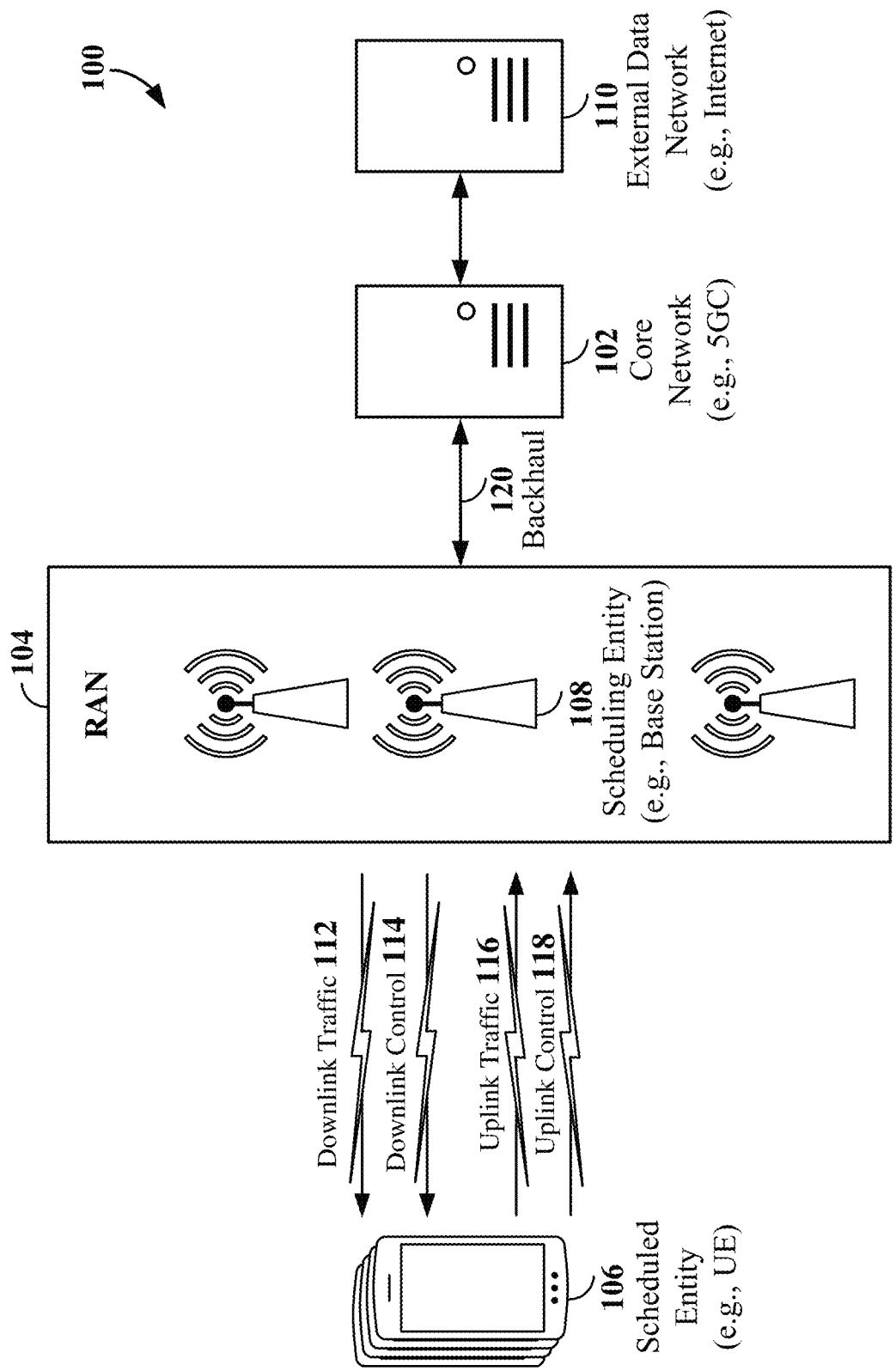
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

For frequency division duplex (FDD) full-duplex (FD) communications to be realized, self-interference from a transmitter of a user equipment (UE) or a base station should be minimized to avoid saturating sensitive amplifiers and front ends of receivers of the UE and base station. To isolate a signal transmitted by a transmitter from a receiver, the frequency band used by the transmitter may be separated from the frequency band used by the receiver. The gap between the two frequency bands may be referred to as a guard band. For time division duplex (TDD) half-duplex (HD) communications, the need for a guard band is obviated because the transmission band and the reception band are one and the same. Therefore, a TDD HD scheme uses less bandwidth than an FDD FD scheme by using the same sub-channels for transmission and reception at separate times. As used herein, references to a frequency band may refer to a 5G new radio (NR) frequency band or NR operating band.

The simultaneous use of the same set of frequency resources (e.g., same carrier bandwidth, same frequency band) for both UL and DL in a given time slot may be referred to herein as sub-band full-duplex (SBFD), also referred to as flexible duplex, in which transmissions in different directions are carried in different sub-bands or bandwidth parts of a carrier bandwidth or frequency band.

Scheduled entities (e.g., UEs or other wireless communication devices) that are able to operate in a full-duplex mode may be able to use SBFD to increase the amount of data transferred in comparison to TDD HD because, as with FDD FD, data may be transmitted and received at the same time, while in contrast to FDD FD, the data may be transmitted and received in the same carrier bandwidth or frequency band.

As used herein, the term "duplex mode" refers to an operational mode of a device (e.g., a scheduled entity, a UE). Examples of duplex modes may include but are not limited to half-duplex (HD), full-duplex (FD), and full-duplex-aware (FD-aware). In a half-duplex operational mode, the device may have two-way communications (e.g., uplink and downlink), but the HD two-way communications do not occur simultaneously. Time division duplex (TDD) is an example of an HD system. In a full-duplex operational mode, the device may have two-way communications, and the FD communications may occur simultaneously. Two types of FD communication systems are provided as non-limiting examples herein; broadly, they may be referred to as paired spectrum and unpaired spectrum FD communication systems. Frequency division duplex (FDD) is an example of an FD paired spectrum system (where uplink and downlink may occur at the same time in different but paired, pre-defined frequency bands). In-band full-duplex (IBFD) and sub-band full-duplex (SBFD) (also referred to as flexible duplex) are two non-limiting examples of FD unpaired spectrum systems (where uplink and downlink may occur at the same time in the same frequency band/carrier bandwidth). In an FD-aware operational mode, the device may be aware that time-frequency resources may be allocated according to any type of FD communication system; however, the device is not configured as an FD device (e.g., the device is only an HD device). Examples described herein may be explained in the context of SBFD systems; however, the use of SBFD systems is exemplary and non-limiting. Other types of unpaired spectrum FD communication systems are within the scope of the disclosure.

Scheduling entities (e.g., gNBs or other radio access network nodes) that support SBFD can provide the improved use of bandwidth for scheduled entities as scheduled entities that are SBFD capable are brought into use. A scheduling entity may configure a time slot (including a set of OFDM symbols) for SBFD by configuring a frequency resource (e.g., use of one new radio (NR) operating band radio channel currently designated for TDD HD operation) for both transmission and reception. An OFDM symbol configured for SBFD use may be referred to as a downlink-uplink (DU) symbol.

However, not all scheduled entities will implement SBFD. For example, some scheduled entities may have an inexpensive front end that includes a switch that couples an antenna to either the scheduled entity receiver or the scheduled entity transmitter, depending on the state of the switch. Thus, such non-SBFD scheduled entities may be configured for either transmission or reception, but not both at the same time. Such designs minimize cost and complexity by doing away with relatively expensive and complex multiplexors and/or circulators at the front ends of scheduled entities. The behavior of a non-SBFD scheduled entity (non-SBFD UE) may be undefined. Examples of non-SBFD scheduled entities may include a legacy scheduled entity, a half-duplex (HD) scheduled entity, a full-duplex-aware (FD-aware) scheduled entity.

Defining the behavior of a non-SBFD UE when encountering DU symbols may enable the non-SBFD UE to continue operations in wireless network environments that begin to use SBFD transceivers and may provide for ongoing and future use of lower-cost non-SBFD UEs in an SBFD environment.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication;

such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
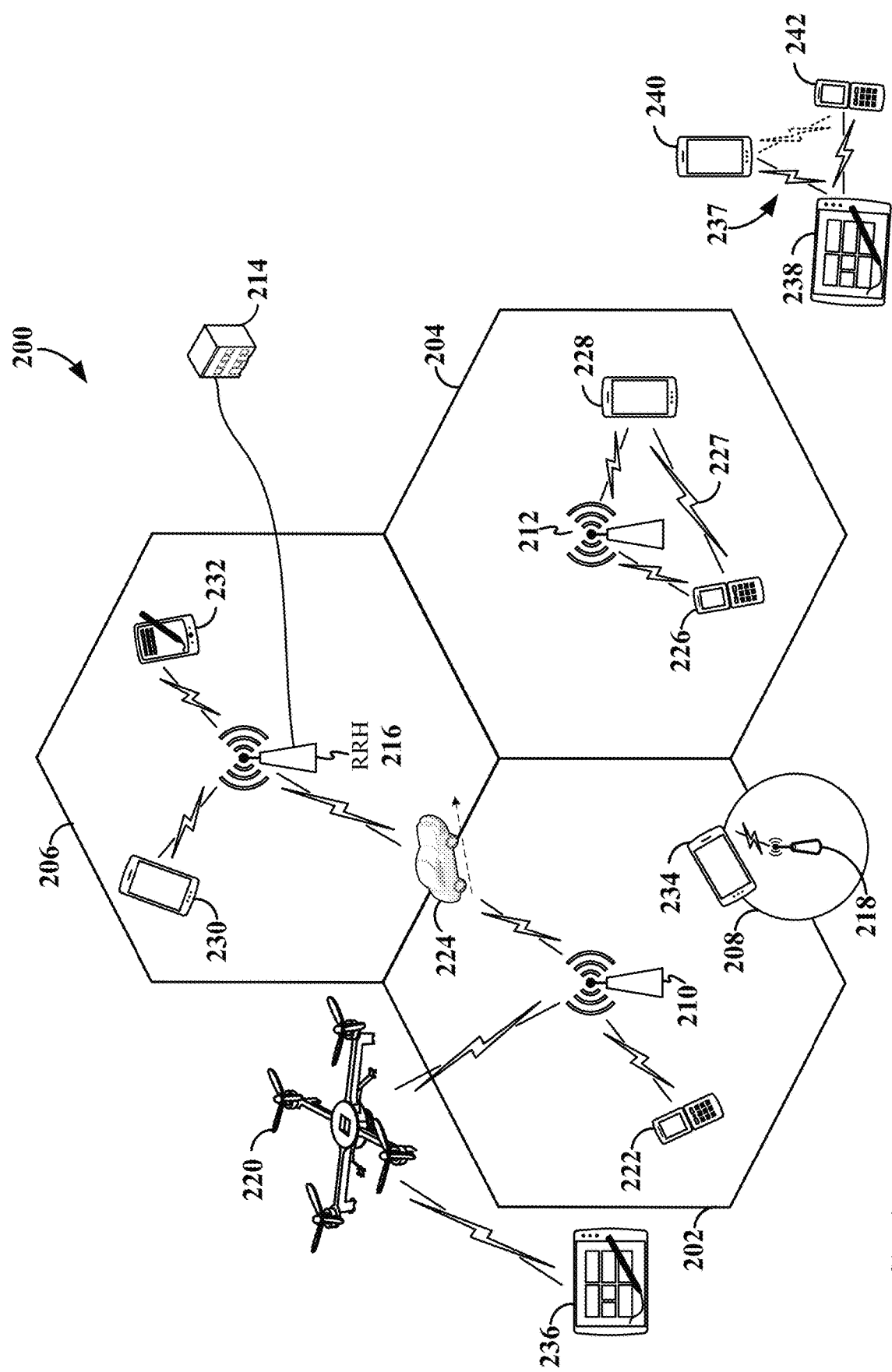
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 3:
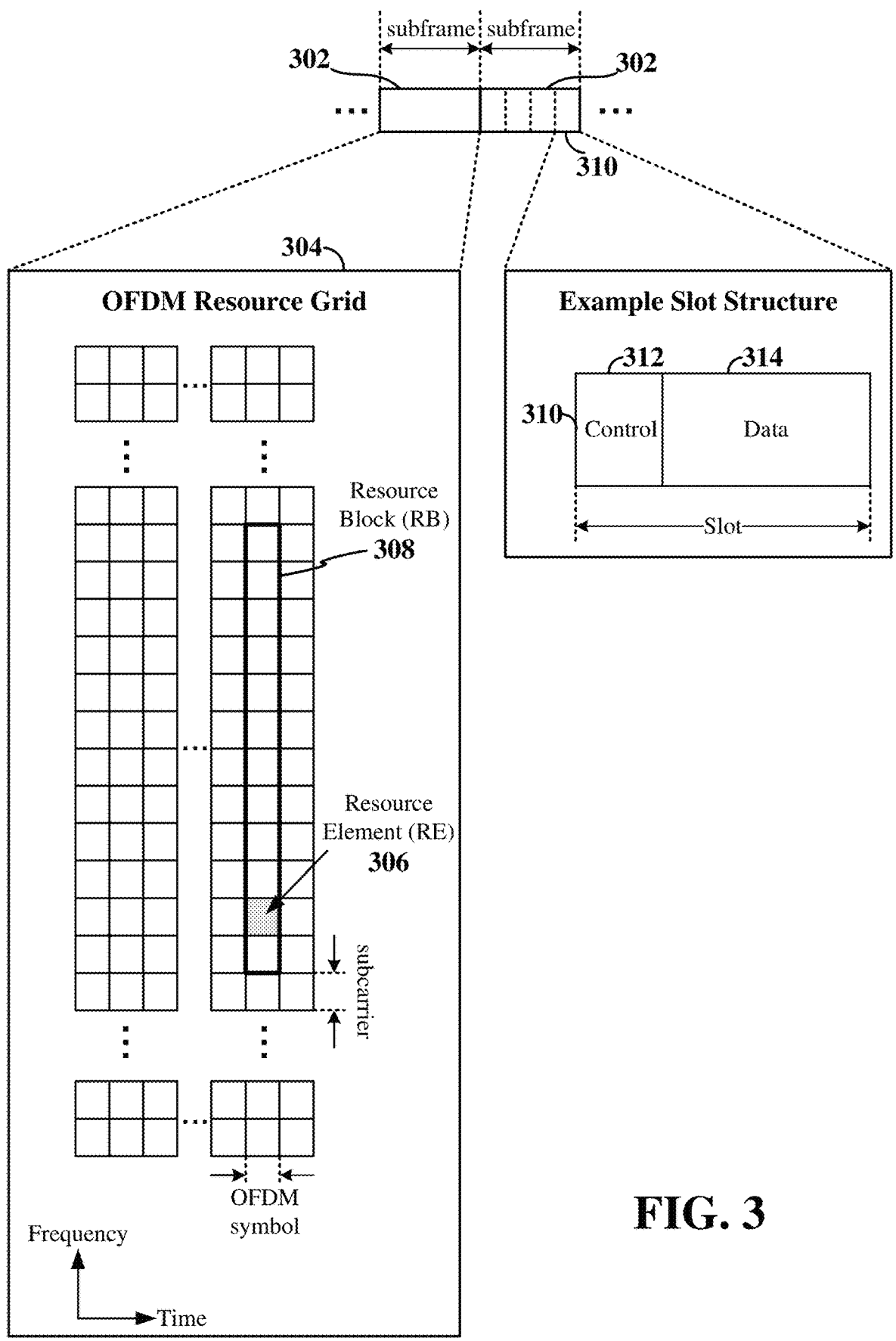
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the transmission and reception scheme utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

FIGS. 4A, 4B, and 4C are schematic illustrations of a wireless communication network 400 and sources of interference for a full-duplex gNB 402 (e.g., a scheduling entity), a half-duplex UE 406, a first full-duplex UE 412, and a second full-duplex UE 408 according to some aspects of the disclosure. In FIG. 4A, the full-duplex gNB 402 is transmitting to the half-duplex UE 406. During the time of the transmission from the full-duplex gNB 402 to the half-duplex UE 406, the full-duplex gNB 402 is receiving, at its receiver (not shown), self-interference 410 from its own transmission to the half-duplex UE 406 as well as interference from a neighboring gNB 404 and an uplink transmission from a second full-duplex UE 408. The half-duplex UE 406 also receives interference from the second full-duplex UE 408 and the neighboring gNB 404. Because it is a half-duplex UE, the half-duplex UE 406 is not transmitting during the time of the transmission from the full-duplex gNB 402 to the half-duplex UE 406, and therefore, the half-duplex UE 406 receives no self-interference.

In FIG. 4B, the full-duplex gNB 402 transmits a downlink transmission to the first full-duplex UE 412. During the time of the transmission of the downlink transmission from the full-duplex gNB 402 to the first full-duplex UE 412, the full-duplex gNB 402 is receiving, at its receiver (not shown), a simultaneous uplink transmission from the first full-duplex UE 412. At the same time as the just mentioned simultaneous downlink and uplink transmissions, the first full-duplex UE 412 is receiving, at its receiver (not shown), self-interference 414 from its own transmission to the full-duplex gNB 402, as well as interference from the neighboring gNB 404 and interference from the second full-duplex UE 408.

In FIG. 4C, the full-duplex gNB 402 receives an uplink transmission from the first full-duplex UE 412. During the time of the transmission of the uplink transmission to the full-duplex gNB 402, the first full-duplex UE 412 is also receiving a transmission from a multi-transmission and reception point (TRP) station (e.g., a macro-cell, small cell, pico-cell, femto-cell, remote radio head, relay node, etc.), here represented as a multi-TRP wireless transceiver station 418. In addition to the signal received from the multi-TRP wireless transceiver station 418, the first full-duplex UE 412 is also receiving, at its receiver (not shown), self-interference 416 from its own transmission to the full-duplex gNB 402.

For the half-duplex UE 406 of FIG. 4A, interference may be mitigated if the interference from the neighboring gNB 404 and second full-duplex UE 408 are at frequencies other than those occupied by the downlink transmission from the full-duplex gNB 402 to the half-duplex UE 406. Similarly, for the first full-duplex UE 412 of FIGS. 4B and 4C, interference may be mitigated if the self-interference 416 from the first full-duplex UE 412, interference from the neighboring gNB 404, and/or interference from the second full-duplex UE 408 are at frequencies other than those occupied by the downlink transmission from the full-duplex gNB 402 to the half-duplex UE 406.

FIG. 5A is a table 500 depicting a plurality of new radio (NR) operating bands 502 (e.g., radio channels), UL operating band frequencies 504, DL operating band frequencies 506, and duplex modes 508 associated with each of the NR operating bands 502 according to some aspects of the disclosure.

FIG. 5B is a diagram illustrating an FDD scheme 510 according to some aspects of the disclosure. In the example shown in FIG. 5B, time is illustrated along the horizontal axis, while frequency is illustrated along the vertical axis. A plurality of physical uplink shared channels (PUSCHs) 512 and uplink control channels 514 are depicted as occupying the UL operating band identified as nx $UL_{FDD}$. A plurality of downlink data channels 516 (e.g., physical downlink shared channels (PDSCHs)) and downlink control channels 518 are depicted as occupying the DL operating band identified as nx $DL_{FDD}$. The UL operating band, nx $UL_{FDD}$, and the DL operating band, nx $DL_{FDD}$, are depicted as being separated in frequency by a guard band 520. The paired use of the nx $UL_{FDD}$ uplink operating band and the nx $DL_{FDD}$ operating band of a given nx operation band may be referred to as paired spectrum. The nomenclature "nx" represents any one of the NR operating bands 502 designated for FDD duplex mode 508. A sub-group 522 of all NR operating bands 502 designated for FDD duplex mode 508 is denoted in FIG. 5A. The operating bands are exemplary and non-limiting.

FIG. 5C is a diagram illustrating a TDD scheme 530 according to some aspects of the disclosure. In the example shown in FIG. 5C, time is illustrated along the horizontal axis, while frequency is illustrated along the vertical axis. A plurality of downlink data channels 532 and downlink control channels 534 are depicted as occupying the operating band identified as ny $UL\&DL_{TDD}$. The single operating band, ny $UL\&DL_{TDD}$, is utilized for uplink and downlink by separating the UL and DL information in time (e.g., they do not occupy the same time slots simultaneously). The unpaired use of the nx $UL_{FDD}$ uplink operating band and the nx $DL_{FDD}$ operating band (both at a same frequency band of a given nx operation band) may be referred to as unpaired spectrum. A physical uplink shared channel (PUSCH) 538 and uplink control channel 536 are depicted as occupying the single operating band, ny $UL\&DL_{TDD}$. The nomenclature "ny" represents any one of the NR operating bands 502 designated for TDD duplex mode 508. A sub-group 523 of all NR operating bands 502 designated for TDD duplex mode 508 is denoted in FIG. 5A. The operating bands are exemplary and non-limiting.

FIG. 5D is a diagram illustrating an SBFD scheme 540 according to some aspects of the disclosure. In the example shown in FIG. 5D, time is illustrated along the horizontal axis, while frequency is illustrated along the vertical axis. As illustrated in the exemplary diagram of FIG. 5D, a full-duplex network may utilize SBFD (e.g., as illustrated in FIG. 6B) in unpaired spectrum, in which transmissions in different directions are carried in different sub-bands or BWPs of the carrier bandwidth (e.g., of a frequency band). A plurality of downlink data channels 544 and downlink control channels 542 and a plurality of PUSCHs 546 and uplink control channels 548 are all depicted as occupying the operating band identified as nz $UL\&DL_{FD}$. The single operating band, nz $UL\&DL_{FD}$, is utilized for uplink and downlink without separating the UL and DL information in time (e.g., they occupy the same time slots simultaneously). The nomenclature "nz" represents any one of the NR operating bands 502 designated for TDD duplex mode 508. A sub-group 523 of all NR operating bands 502 designated for TDD duplex mode 508 is denoted in FIG. 5A. A first guard band 550 and a second guard band 552 are depicted in FIG. 5D. The first guard band 550 and the second guard band 552 may be the same bandwidth or different bandwidths. Either or both of the first guard band 550 and the second guard band 552 may be zero bandwidth guard bands. The first guard band 550 and the second guard band 552 (individually or collectively) in the unpaired spectrum may be smaller than the guard band 520 in the paired spectrum.

FIGS. 6A-6C illustrate examples of full-duplex communication in unpaired spectrum. In the examples shown in FIGS. 6A-6C, time is in the horizontal direction and frequency is in the vertical direction. Here, a carrier bandwidth 602 (or set of one or more active bandwidth parts (BWPs)) is illustrated along the frequency axis and a slot 604 is illustrated along the time axis.

FIGS. 6A and 6B illustrate in-band full-duplex (IBFD) communication, while FIG. 6C illustrates sub-band FD communication. For IBFD communication, as shown in FIGS. 6A and 6B, downlink and uplink transmissions occur on the same time and frequency resources. For example, downlink resources 606 allocated for transmissions in the downlink direction overlap in both time and frequency with uplink resources 608 allocated for transmissions in the uplink direction. The overlap may be full (as shown in FIG. 6A) or partial (as shown in FIG. 6B).

For sub-band FD communication, as shown in FIG. 6C, the carrier bandwidth 602 (or active BWPs) may be divided into sub-bands 610a and 610b. Each sub-band 610a and 610b may be allocated for communication in a single direction. For example, sub-band 610a may be allocated for downlink transmissions, while sub-band 610b may be allocated for uplink transmissions. Thus, downlink resources 606 allocated for transmissions in the downlink direction overlap in time, but not in frequency, with uplink resources 608 allocated for transmissions in the uplink direction. The downlink resources 606 may further be separated from the uplink resources 608 in the frequency domain by a guard band 612 to isolate the uplink and downlink transmissions in frequency.

Figure 7A:
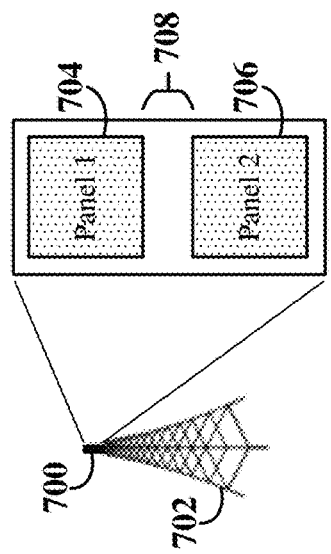
FIG. 7A is a schematic diagram of a base station (e.g., gNB) including a multi-panel antenna array configured for full-duplex communication according to some aspects of the disclosure.

FIG. 7A is a schematic diagram of a base station 702 (e.g., gNB) including a multi-panel antenna array 700 configured for full-duplex communication according to some aspects of the disclosure. The antenna array 700 is divided into two panels (panel 1 704, panel 2 706) with a physical separation 708 therebetween. Each of the two panels may be a subarray of antennas. A given panel may transmit and/or receive a beam or a beam group. In one example, the panels may be physically separated from one another by a distance selected to provide improved isolation between simultaneous transmission (Tx) and reception (Rx) operations in full-duplex mode, thereby mitigating at least a portion of self-interference resulting from signals being simultaneously transmitted/received. The multi-panel antenna configuration shown in FIG. 7A may also be applicable to UEs to enable full-duplex communication (e.g., SBFD) at the UE.

Figure 7B:
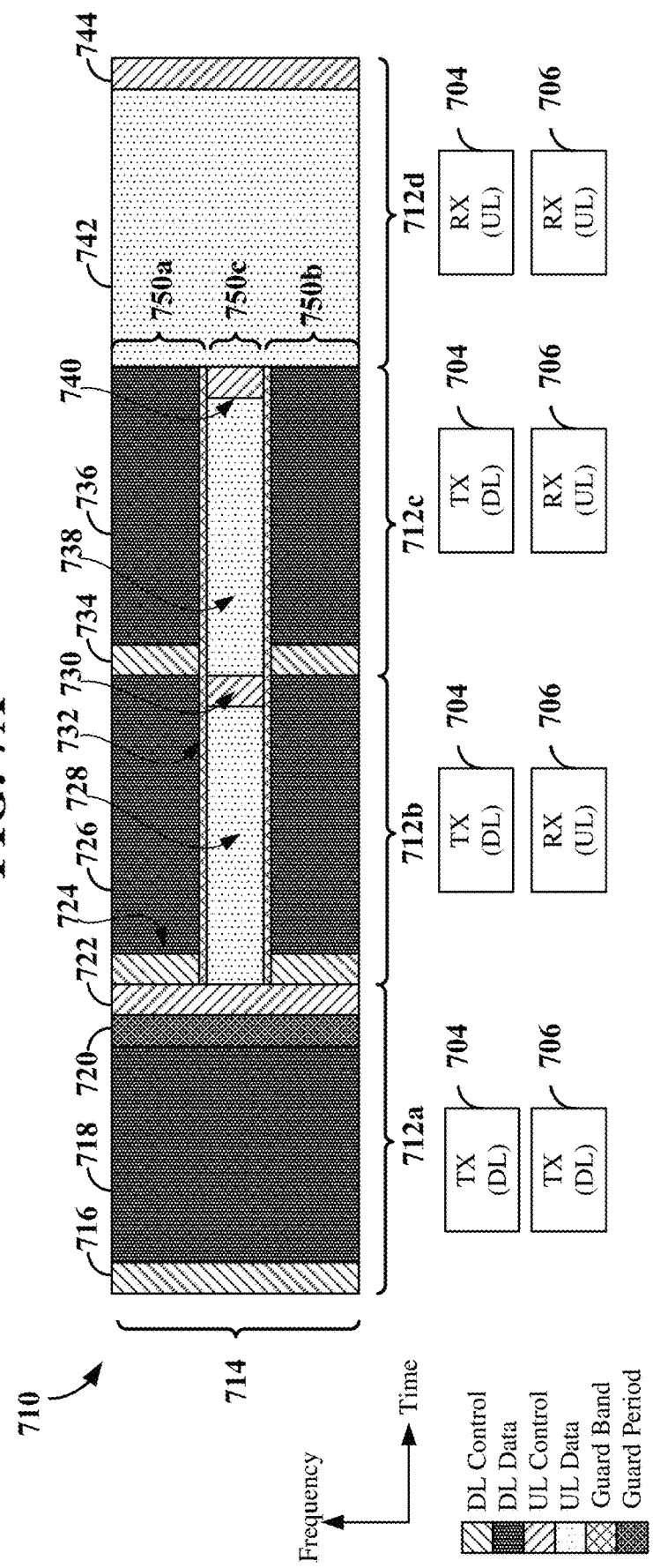
FIG. 7B is a schematic illustration of an example of full-duplex wireless communication using the multi-panel antenna array shown in FIG. 7A according to some aspects of the disclosure.

FIG. 7B is a schematic illustration of an example of sub-band full-duplex wireless communication 710 using the multi-panel antenna array 700 shown in FIG. 7A according to some aspects. In the example shown in FIG. 7B, time is in the horizontal direction with units of slots 712a-712d, each including a plurality of OFDM symbols; and frequency is in the vertical direction. Here, a carrier bandwidth 714 (or set of one or more active BWPs) is illustrated along the frequency axis. The carrier bandwidth 714 (or active BWPs) may be divided into a number of sub-bands 750a-750c for sub-band FD operation.

In the example shown in FIG. 7B, in slot 712a, the antenna array 700 is first configured for downlink (DL) communication (e.g., DL burst 716 and DL data portion 718). The DL burst 716 may include DL control transmitted within the first few symbols of the slot 712a. The DL control may include, for example, a physical downlink control channel (PDCCH) carrying DCI that may be related to the slot 712a or a previous or subsequent slot. In an example, the DCI may include common DCI or UE-specific DCI. The common DCI may include, for example, common control information broadcast to a group of UEs or all UEs in the cell. The UE-specific DCI may include, for example, HARQ feedback information (e.g., ACK/NACK), scheduling information for scheduling a downlink data transmission and/or uplink transmission in the slot 712a or a subsequent slot (e.g., slot 712b, 712c, and/or 712d), and other suitable information. The DL burst 716 may further include various DL reference signals (e.g., SSB and/or CSI-RS). In this example, both panel 1 704 and panel 2 706 may be configured for DL transmission. The DL data portion 718 may include DL data carried within, for example, a PDSCH. In addition to the DL data, the DL data portion 718 may further include DL reference signals (e.g., DMRS) for use in demodulating and decoding the DL data.

Slot 712a may also include a common uplink (UL) burst 722 at the end of slot 712a. The common UL burst 722 may include, for example, a PUCCH carrying UCI and other UL signals. As illustrated in FIG. 7B, the end of the DL data portion 718 may be separated in time from the beginning of the UL burst 722. This time separation 720 may sometimes be referred to as a gap, a guard period, a guard interval, and/or various other suitable terms. This separation may provide time for the base station and UE to perform a switch-over between transmitting and receiving, or vice-versa. In this example, both panel 1 704 and panel 2 706 may be configured for UL transmission during the UL burst 722.

In slots 712b and 712c, the antenna array 700 is configured for both DL communication and UL communication. For example, in slots 712b and 712c, the carrier bandwidth 714 (or active BWPs) is shown partitioned between uplink transmissions and downlink transmissions. Sub-bands 750a and 750b are allocated for downlink transmissions, while sub-band 750c is allocated for uplink transmissions. In an example operation of the sub-band full-duplex configuration shown in FIG. 7, panel 1 704 may be configured for DL transmission at both edges (e.g., sub-bands 750a and 750b) of the carrier bandwidth 714 (or active BWPs) and panel 2 706 may be configured for UL reception in the middle (e.g., sub-band 750c) of the carrier bandwidth 714 (or active BWPs).

In each of the sub-band FD slots 712b and 712c, the DL sub-bands 750a and 750b include a DL burst 724 and 734, respectively, which may include a PDCCH carrying DCI and/or DL reference signals, in the initial or beginning portion of the slots 712b and 712c. Following the DL bursts 724 and 734, slots 712b and 712c each include a DL data portion 726 and 736, respectively, for transmitting DL data within sub-bands 750a and 750b. For example, the DL data may be transmitted within a PDSCH. In addition to the DL data, the DL data portions 726 and 736 may further include DL reference signals (e.g., DMRS) for use in demodulating and decoding the DL data.

In the uplink (UL) sub-band 750c, the slots 712b and 712c each include an UL data portion 728 and 738, respectively, for transmitting UL data. For example, the UL data may be transmitted within a PUSCH. Following the UL data portions 728 and 738, the UL sub-band 750c of slots 712b and 712c each include an UL burst 730 and 740, respectively. The UL burst 730 and 740 may include, for example, a PUCCH including UCI and/or other UL signals. Guard bands 732 are further provided between the UL sub-band 750c and the DL sub-bands 750a and 750b to mitigate self-interference between simultaneous DL transmissions in the DL sub-bands 750a and 750b and UL transmissions in the UL sub-band 750c.

Slots 712b and 712c are sub-band FD slots utilizing FDM for multiplexing uplink and downlink transmissions in frequency. The sub-band full-duplex slot configurations shown in FIG. 7 are merely exemplary, and other configurations of sub-band full-duplex slots may be utilized in various aspects of the disclosure. For example, sub-band full-duplex slots including other configurations of UL and DL sub-bands (e.g., the configuration shown in FIG. 4C or other suitable sub-band configurations), may be employed in various aspects.

In slot 712d, the antenna array 700 is configured for UL communication. For example, slot 712d includes an UL data portion 742 followed by an UL burst 744. The UL data portion 742 and UL burst 744 may include UL control information and/or UL data, as discussed above. In this example, both panel 1 704 and panel 2 706 may be configured for UL reception. Slots 712a and 712d are half-duplex TDD slots utilizing TDM for multiplexing DL transmissions and UL transmissions in time.

In some aspects of the disclosure, one or more slots may be flexible slots including one or more flexible symbols that may be configured as either half-duplex symbols (e.g., all UL or all DL) or sub-band full-duplex symbols (e.g., including both UL and DL transmissions). For example, in slot 712b, the DL burst 724 may be configured to occupy all sub-bands 750a-750c of the slot 712b, and as such, the symbols corresponding to the DL burst 724 may be flexible symbols that may be configured as half-duplex symbols to enable DL communication across all sub-bands 750a-750c. Similarly, the UL burst 730 may be configured to occupy all sub-bands 750a-750c of the slot 712b, and as such, the symbols corresponding to the UL burst 730 may be flexible symbols that may be configured as half-duplex symbols to enable UL communication across all sub-bands 750a-750c.

In sub-band full-duplex operation, the slot formats can be classified according to the duplex mode of the base station. For example, the slot may be classified as a half-duplex slot (e.g., slot 712a or 712b) including symbols dedicated to either DL transmission or UL transmission based on TDM. In addition, the slot may be classified as a full-duplex (or sub-band full-duplex) slot (e.g., slot 712b or 712c) including a hybrid of DL and UL transmissions based on FDM. The slot may further be classified as a flexible slot that may be partially or fully configurable (e.g., one or more symbols may be flexible symbols).

In various aspects of the disclosure, to accommodate low latency and/or high reliability traffic, such as ultra-reliable low-latency communication (URLLC), a base station operating in sub-band full-duplex mode may dynamically change the slot format of a slot between half-duplex and sub-band full-duplex and/or may change flexible symbols within a flexible slot between half-duplex and sub-band full-duplex. A slot format indicator (SFI) indicating the slot format of the slot may be signaled, for example, via DCI mapped to a PDCCH or medium access control (MAC) control element (MAC-CE) mapped to a PDSCH.

Figure 8:
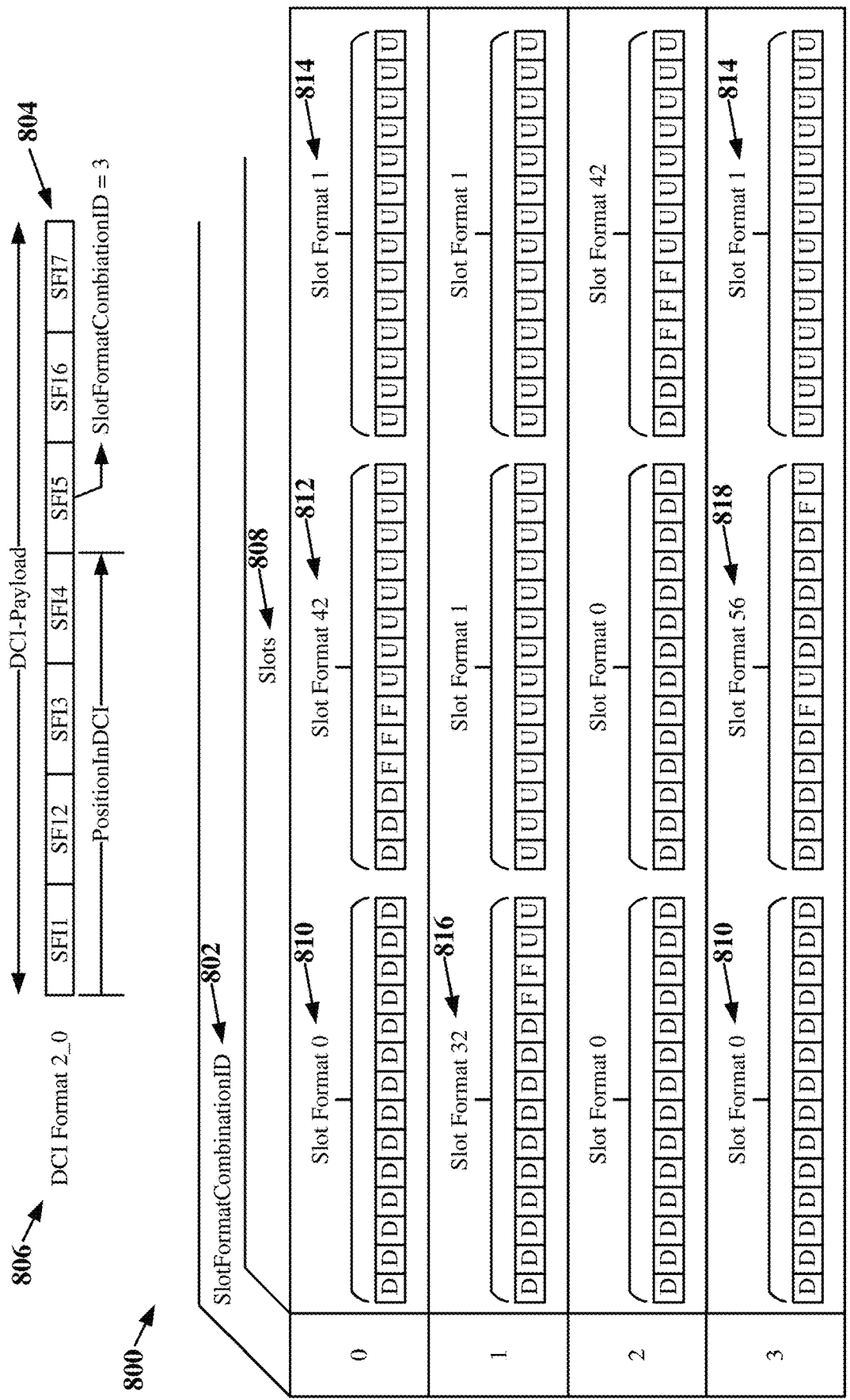
FIG. 8 is a tabular depiction of four tuples of slot formats organized according to SlotFormatCombinationID number that may be specified by a slot format indicator (SFI) in a downlink control information (DCI) payload according to some aspects of the disclosure.

FIG. 8 is a tabular depiction of four tuples 800 of slot formats organized according to SlotFormatCombinationID number 802 that may be specified by a slot format indicator (SFI) 804 in a downlink control information (DCI) payload 806 according to some aspects of the disclosure. In the example of FIG. 8, formats of the slots 808 include slot format 0 810, slot format 42 812, slot format 1 814, slot format 32 816, and slot format 56 818. The DCI payload 806 may be, for example, in the form of a DCI Format 2_0 message. In the example of FIG. 8, the DCI payload includes seven SFIs. In the example of FIG. 8, a scheduling entity (e.g., gNB) has used SFI5 of the DCI payload to convey the slot format combination to a scheduled entity, for example. The scheduled entity may extract SFI5 from the DCI payload. In the example, SFI5 could point to SlotFormatCombinationID3 802, from among the tuples 800 of slot formats of FIG. 8. SlotFormatCombinationID3 802 corresponds to slot format 0 810 (representing a slot formatted with all DL symbols), slot format 56 818 (representing a slot formatted with a combination of DL, UL, and flexible (F) symbols), and slot format 1 814 (representing a slot formatted with all UL symbols).

The slot formats of FIG. 8 may not provide for situations in which a scheduling entity seeks to format a slot with at least one downlink-uplink (DU) symbol. The at least one DU symbol may be a symbol reserved for a downlink transmission and an uplink transmission (and respective reception) at the same time in the same carrier bandwidth (e.g., of the same frequency band).

As described above, aside from the DL, UL, and F symbols, a scheduling entity may configure a slot for SBFD (or more generally, full-duplex) operation with at least one downlink-uplink (DU) symbol reserved for both downlink transmission and uplink transmission at the same time in the same carrier bandwidth (e.g., of the same frequency band). A DU symbol may be different from a downlink (DL) symbol, an uplink (UL) symbol, and a flexible (F) symbol. For example, the DL symbol and the UL symbol are reserved for DL transmission and UL reception, respectively. DL transmission and UL transmission are examples of unidirectional communication. DL transmission and UL transmission (e.g., reception of an UL transmission) may occur at the same time at different frequencies (as in the case of FDD FD) or at different times at the same frequency (as in the case of TDD HD), but do not occur at the same time in the same frequency band (as in the case of SBFD). The F symbol is interpreted as either a UL symbol or a DL symbol and, as such, has the same characteristics as either a DL symbol or a UL symbol. An F symbol does not combine the characteristics of the UL symbol and the DL symbol. As used herein, the words "symbol type" may be used to identify the D, U, F, and/or DU symbol types.

Scheduling entities that are able to conduct SBFD operations may be oblivious to the capabilities of the scheduled entities they serve and may seek to configure time slots for SBFD (or full-duplex) operation using one or more DU symbols. However, as mentioned above, the behavior of a non-SBFD scheduled may be undefined. Defining the behavior of a non-SBFD UE when encountering DU symbols may enable the non-SBFD UE to continue operations in wireless network environments that begin to use SBFD transceivers and may provide for ongoing and future use of lower-cost non-SBFD UEs in an SBFD environment.

Figure 9:
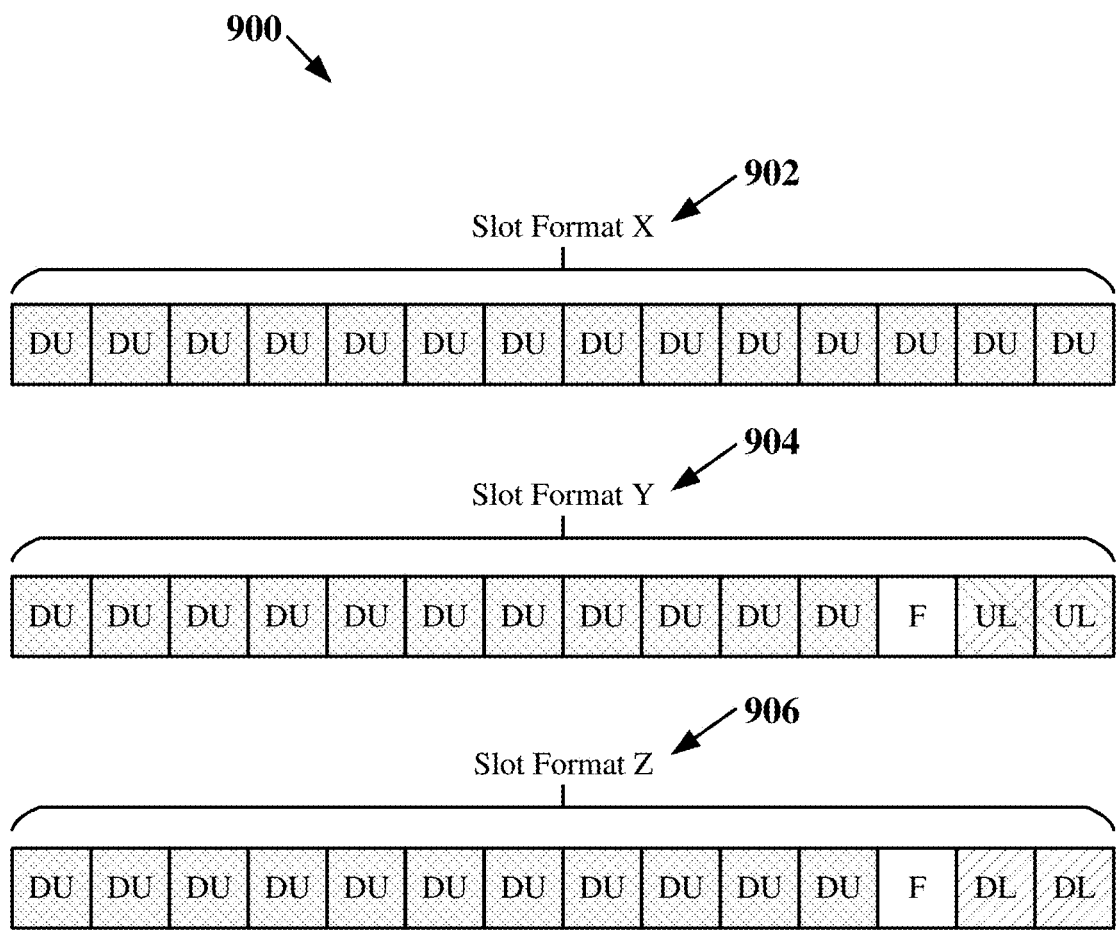
FIG. 9 is a diagram depicting one tuple of exemplary and non-limiting slot formats, where each of the three exemplary slot formats depicted includes at least one DU symbol according to some aspects of the disclosure.

FIG. 9 is a diagram depicting one tuple 900 of exemplary and non-limiting slot formats, where each of the three exemplary slot formats depicted includes at least one DU symbol according to some aspects of the disclosure. According to some existing specifications, a plurality of reserved SFIs exist. At least some of these reserved SFIs may be used to describe slot formats that include at least one DU symbol. For example, in 5G, SFI 56 to SFI 254 are reserved and presently undefined. Accordingly, aspects described herein may utilize SFIs that include, for example, slot formats that describe a full set of DU symbols (e.g., 14 DU symbols) and SFIs that include, for example, a mixed set of DU, DL, UL, and F symbols (e.g., where the mixed set includes a combination of at least one DU symbol plus some combination of DL, UL, and/or F symbols). FIG. 9 presents three exemplary slot formats.

In some examples, a non-SBFD scheduled entity (e.g., a UE or other wireless communication devices) may be a scheduled entity that is only half-duplex capable but is aware of a full-duplex slot that includes at least one DU symbol. The FD-aware non-SBFD scheduled entity may be configured with a DU slot (that is, a slot including at least one DU symbol), where the FD-aware non-SBFD scheduled entity is able to interpret frequency domain information associated with the DU slot. An FD-aware non-SBFD scheduled entity may, for example, operate in a UL mode or a DL mode during a DU slot.

The first exemplary slot format 902 (e.g., slot format X) includes 14 symbols. All 14 of the symbols of the first exemplary slot format 902 are DU symbols. The second exemplary slot format 904 (e.g., slot format Y) includes 14 symbols. The first 11 symbols of the second exemplary slot format 904 are DU symbols, the $12^{th}$ symbol is an F symbol, and the final two symbols are UL symbols. The third exemplary slot format 906 (e.g., slot format Z) includes 14 symbols. The first 11 symbols of the third exemplary slot format 906 are DU symbols, the $12^{th}$ symbol is an F symbol, and the final two symbols are DL symbols. The exemplary slot formats are three of many possible combinations of DU plus F, DL, and/or UL symbols. Slot formats having fewer or greater numbers of symbols than the 14 symbols shown for each of the three exemplary slot formats of FIG. 9 are within the scope of the disclosure.

However, a problem may exist when a scheduling entity formats a slot with at least one DU symbol, and a scheduled entity, seeking to comply with the slot format presented by the scheduling entity, is not configured for full-duplex operation (e.g., a non-SBFD scheduled entity). Examples of such non-SBFD scheduled entities may be scheduled entities configured for half-duplex (HD) operation and scheduled entities configured for full-duplex-aware (FD-aware) operation. These non-SBFD scheduled entities may have undefined behavior for situations where slot formats include slot configurations that include at least one DU symbol (sometimes referred to herein as a DU slot configuration). Therefore, aspects of the disclosure may provide for DU slot interpretations that may be used by non-SBFD scheduled entities that may operate in a wireless communication network that utilizes a slot format that includes at least one DU symbol. For example, various aspects of the disclosure may inform the behavior of non-SBFD scheduled entities that encounter a slot format that includes at least one DU symbol in the course of operations in a wireless communication network.

Figure 10:
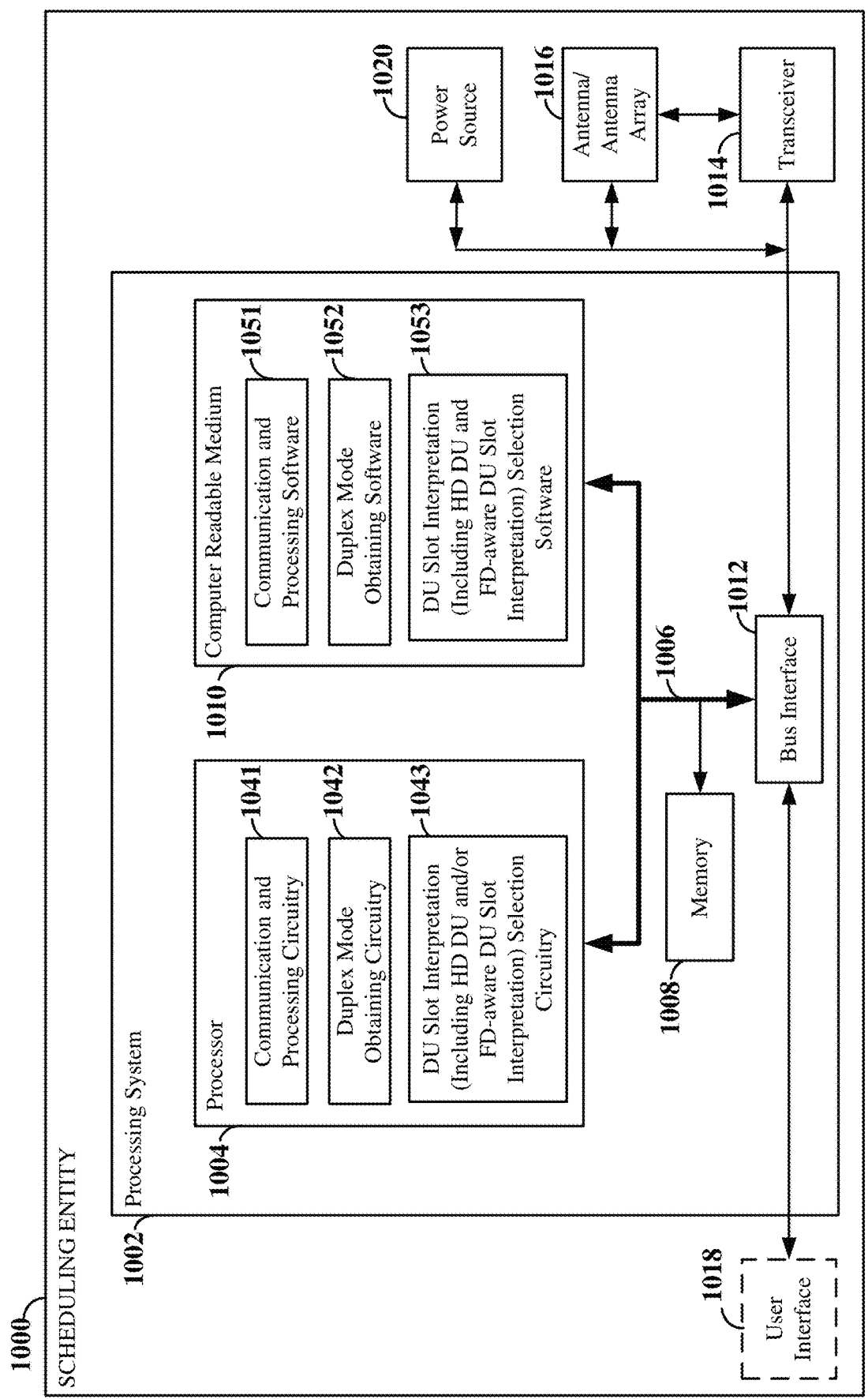
FIG. 10 is a block diagram illustrating an example of a hardware implementation of a scheduling entity employing a processing system according to some aspects of the disclosure.

FIG. 10 is a block diagram illustrating an example of a hardware implementation of a scheduling entity 1000 employing a processing system 1002 according to some aspects of the disclosure. The scheduling entity 1000 may be, for example, a base station, an eNB, a gNB, or a network access node as illustrated in any one or more of FIGS. 1, 2, 4, and/or 7.

In accordance with various aspects of the disclosure, an element, or any portion of an element, or any combination of elements may be implemented with a processing system 1002 that includes one or more processors, such as processor 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the methods or processes described and illustrated, for example, in FIGS. 11, 12, 14 and/or 15.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1002 may be implemented with a bus architecture, represented generally by the bus 1006. The bus 1006 may include any number of interconnecting buses and bridges depending on the specific application of the processing system 1002 and the overall design constraints. The bus 1006 communicatively couples together various circuits, including one or more processors (represented generally by the processor 1004), a memory 1008, and computer-readable media (represented generally by the computer-readable medium 1010). The bus 1006 may also link various other circuits such as timing sources, peripherals, voltage regulators, and power management circuits, which are well known in the art, and therefore, will not be described any further.

A bus interface 1012 provides an interface between the bus 1006 and a transceiver 1014. The transceiver 1014 may be a wireless transceiver. The transceiver 1014 may provide a means for communicating with various other apparatus over a transmission medium (e.g., air interface). The transceiver 1014 may further be coupled to one or more antennas/antenna array/antenna module (hereinafter antenna 1016). In some examples, the transceiver 1014 and the antenna 1016 may be configured to transmit and receive using directional beamforming (e.g., using a single beam or a beam pair link (BPL) on each of the uplink and downlink transmissions). The bus interface 1012 further provides an interface between the bus 1006 and a user interface 1018 (e.g., keypad, display, touch screen, speaker, microphone, control features, etc.). Of course, such a user interface 1018 is optional and may be omitted in some examples. In addition, the bus interface 1012 further provides an interface between the bus 1006 and a power source 1020 of the scheduling entity 1000.

The processor 1004 is responsible for managing the bus 1006 and general processing, including the execution of software stored on the computer-readable medium 1010. The software, when executed by the processor 1004, causes the processing system 1002 to perform the various functions described below for any particular apparatus. The computer-readable medium 1010 and the memory 1008 may also be used for storing data that is manipulated by the processor 1004 when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1010. When executed by the processor 1004, the software may cause the processing system 1002 to perform the various processes and functions described herein for any particular apparatus.

The computer-readable medium 1010 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1010 may reside in the processing system 1002, external to the processing system 1002, or distributed across multiple entities including the processing system 1002. The computer-readable medium 1010 may be embodied in a computer program product or article of manufacture. By way of example, a computer program product or article of manufacture may include a computer-readable medium in packaging materials. In some examples, the computer-readable medium 1010 may be part of the memory 1008. Those skilled in the art will recognize how best to implement the described functionality presented throughout this disclosure depending on the particular application and the overall design constraints imposed on the overall system.

In some aspects of the disclosure, the processor 1004 may include communication and processing circuitry 1041 configured for various functions, including, for example, communicating with a scheduled entity (e.g., a UE or other wireless communication device), a network core (e.g., a 5G core network), other scheduling entities, or any other entity, such as, for example, local infrastructure or an entity communicating with the scheduling entity 1000 via the Internet, such as a network provider. In some examples, the communication and processing circuitry 1041 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1041 may include one or more transmit/receive chains.

In some implementations where the communication involves receiving information, the communication and processing circuitry 1041 may obtain information from a component of the scheduling entity 1000 (e.g., from the transceiver 1014 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1008, or to the bus interface 1012. In some examples, the communication and processing circuitry 1041 may receive one or more of: signals, messages, other information, or any combination thereof. In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for processing, including a means for demodulating, a means for decoding, etc.

In some implementations where the communication involves sending (e.g., transmitting) information, the communication and processing circuitry 1041 may obtain information (e.g., from another component of the processor 1004, the memory 1008, or the bus interface 1012), process (e.g., modulate, encode, etc.) the information, and output the processed information. For example, the communication and processing circuitry 1041 may output the information to the transceiver 1014 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., a means for transmitting). In some examples, the communication and processing circuitry 1041 may include functionality for a means for generating, including a means for modulating, a means for encoding, etc.

The communication and processing circuitry 1041 may further be configured to transmit, to the scheduled entity, DU slot interpretations, or values representative of DU slot interpretations, which the scheduled entity may use to interpret DU slots. For example, a first value indicative of the selected HD DU slot interpretation (if the duplex mode of the scheduled entity is HD) or a second value indicative of the selected FD-aware DU slot interpretation (if the duplex mode of the scheduled entity is FD-aware) may be performed by the communication and processing circuitry 1041. Transmission may be accomplished, for example, via RRC signaling. Other ways of transmitting the first and second values are within the scope of the disclosure. In addition, the communication and processing circuitry 1041 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) via the antenna 1016 and the transceiver 1014. The communication and processing circuitry 1041 may further be configured to execute communication and processing software 1051 stored on the computer-readable medium 1010 to implement one or more functions described herein.

In some aspects of the disclosure, the processor 1004 may include duplex mode obtaining circuitry 1042 configured for various functions, including, for example, obtaining a duplex mode of a scheduled entity (e.g., a UE or other wireless communication device) in wireless communication with the scheduling entity. In some examples, various duplex modes may include half-duplex (HD), full-duplex (FD), and full-duplex-aware (FD-aware); however, examples of duplex modes include but are not limited to HD, FD, (FD-aware), frequency division duplex (FDD), time division duplex (TDD), sub-band full-duplex (SBFD) (also referred to as flexible duplex), in-band full-duplex (IBFD), and spatial division duplex (SDD). The duplex mode obtaining circuitry 1042 may also determine whether the scheduled entity is preconfigured to interpret DU slots (e.g., slots formatted with at least one DU symbol). The duplex mode and/or whether the scheduled entity is preconfigured to interpret DU slots may be obtained, for example, from the scheduled entity via signaling (e.g., RRC signaling) and/or from a centralized function or server such as a unified data management (UDM) function or a home subscriber server (HSS). The preceding list is exemplary and non-limiting. Other ways for the scheduling entity to obtain the duplex mode of the scheduled entity and/or determine whether the scheduled entity is preconfigured to interpret DU slots are within the scope of the disclosure. In some examples, the duplex mode obtaining circuitry 1042 may include one or more hardware components that provide the physical structure that performs processes related to performing the obtaining of the duplex mode of the scheduled entity and/or the determination of whether the scheduled entity is preconfigured to interpret DU slots. The duplex mode obtaining circuitry 1042 may further be configured to execute duplex mode obtaining software 1052 stored on the computer-readable medium 1010 to implement one or more functions described herein.

In some aspects of the disclosure, the processor 1004 may include DU slot interpretation selection circuitry 1043 configured for various functions, including, for example, selecting a downlink-uplink (DU) slot interpretation to be applied by the scheduled entity to a slot including a DU symbol based on the duplex mode of the scheduled entity, where the DU symbol may be reserved for downlink and uplink transmissions at the same time in the same carrier bandwidth (e.g., of the same frequency band). The DU slot interpretation selection circuitry 1043 may include HD DU and/or FD-aware DU slot interpretation selection aspects. In some examples, the DU slot interpretation selection circuitry 1043 may include one or more hardware components that provide the physical structure that performs processes related to the selection of the DU slot interpretation to be applied by the scheduled entity to a slot including a DU symbol based on the duplex mode of the scheduled entity. The DU slot interpretation selection circuitry 1043 may further be configured to execute DU slot interpretation selection software 1053 stored on the computer-readable medium 1010 to implement one or more functions described herein.

Figure 11:
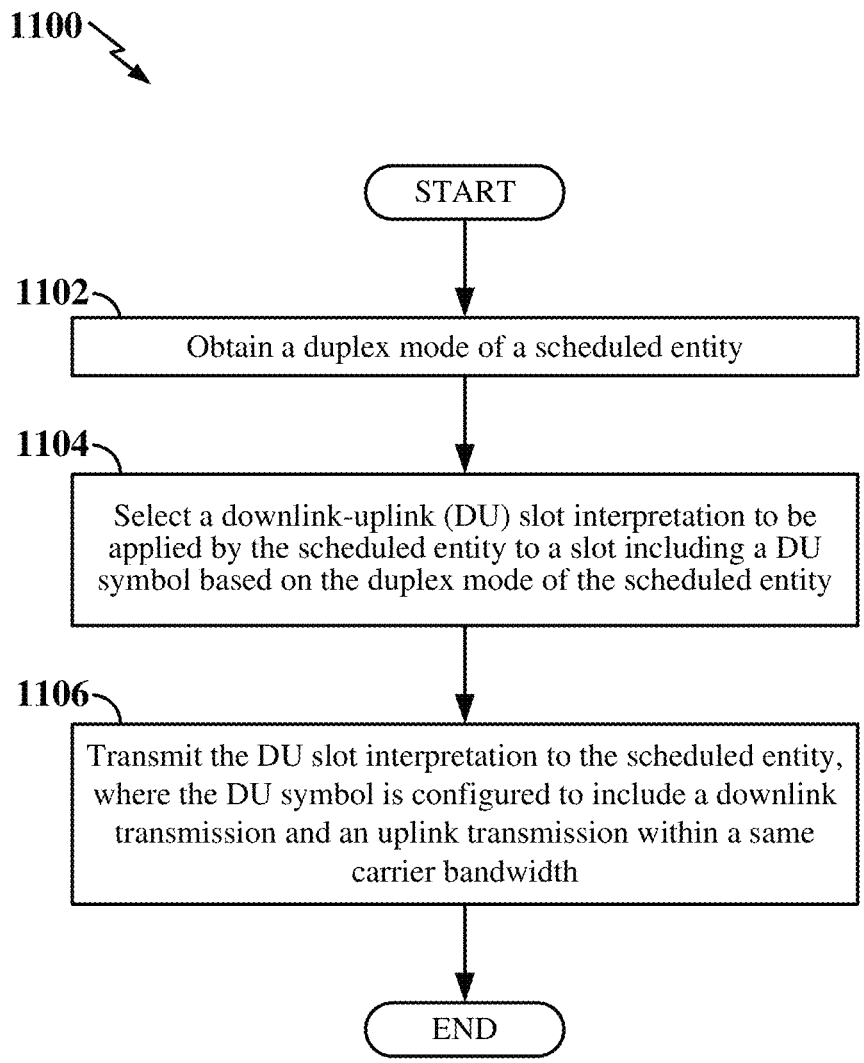
FIG. 11 is a flow chart illustrating an exemplary process (e.g., a method of wireless communication) at a scheduling entity in a wireless communication network according to some aspects of the disclosure.

FIG. 11 is a flow chart illustrating an exemplary process 1100 (e.g., a method of wireless communication) at a scheduling entity in a wireless communication network according to some aspects of the disclosure. The scheduling entity (e.g., a network access node, a base station, a gNB) may configure a slot with at least one downlink-uplink (DU) symbol reserved for a downlink transmission and an uplink transmission. The DU symbol may be configured to include a downlink transmission and an uplink transmission within a same carrier bandwidth (e.g., within a same frequency band). According to some aspects, the DU symbol may be reserved for downlink transmission and uplink transmission at the same time in the same carrier bandwidth (e.g., of the same frequency band). As described below, some or all illustrated features may be omitted in a particular implementation within the scope of the present disclosure, and some illustrated features may not be required for implementation of all examples. In some examples, the process 1100 may be carried out by the scheduling entity 1000 illustrated in FIG. 10. In some examples, the process 1100 may be carried out by any suitable apparatus or means for carrying out the functions or algorithms described herein.

At block 1102, the scheduling entity may obtain a duplex mode of a scheduled entity (e.g., a UE or other wireless communication device). In some examples, the obtained duplex mode may be half-duplex (HD), full-duplex (FD), or full-duplex-aware (FD-aware); however, the obtained duplex modes are not limited to HD, FD, and FD-aware. For instance, examples of duplex modes may include but are not limited to HD, FD, (FD-aware), frequency division duplex (FDD), time division duplex (TDD), sub-band full-duplex (SBFD) (also referred to as flexible duplex), in-band full-duplex (IBFD), and spatial division duplex (SDD). For example, the communication and processing circuitry 1041, the duplex mode obtaining circuitry 1042, and/or the transceiver 1014 and the antenna 1016, shown and described above in connection with FIG. 10, may provide a means to obtain the duplex mode of a scheduled entity.

At block 1104, the scheduling entity may select a downlink-uplink (DU) slot interpretation to be applied by the scheduled entity to a slot including a DU symbol based on the duplex mode of the scheduled entity. The DU symbol may be configured to include a downlink transmission and an uplink transmission within a same carrier bandwidth (e.g., within a same frequency band). In some aspects, the DU symbol may be different from a downlink (DL) symbol, an uplink (UL) symbol, and a flexible (F) symbol. According to some aspects, the scheduling entity may also transmit downlink control information (DCI) to the scheduled entity, where the DCI may include slot information for the slot including the DU symbol (or according to some aspects, where the DCI may be indicative of the slot including the DU symbol). For example, slot information may include at least one of: slot format indication (SFI), slot format combination identifier (SlotFormatCombinationID), slot format number or ID, symbol type, or symbol location. In one example, the uplink transmission and the downlink transmission may overlap partially or fully within the carrier bandwidth (e.g., within a frequency band) within the DU symbol. In another example, the uplink and the downlink may occur at the same time at different non-overlapping frequencies within the DU symbol. In some examples, the DL symbol and the UL symbol are reserved for DL and UL, respectively, at: a same first time at different respective first frequencies in paired spectrum, or at different respective second times at a same second frequency; and the F symbol may be interpreted as either the UL symbol or the DL symbol. In some examples, the DU symbol is reserved for DL and UL at: a same third time at different respective third frequencies in unpaired spectrum (e.g., FIG. 5D, ref. no. 530 or FIG. 6B ref. no. 602) or a same fourth time at a same fourth frequency (e.g., FIG. 6A ref. no. 614), for example, in unpaired spectrum. According to some aspects, the different respective first frequencies in the paired spectrum may have a first guard band therebetween, the different respective third frequencies in the unpaired spectrum may have a second guard band therebetween, and the second guard band may be smaller than the first guard band.

According to one example, if the duplex mode of the scheduled entity is half-duplex (HD), then at block 1104, selecting the DU slot interpretation may further include selecting at least one of: a first DU slot interpretation that causes the scheduled entity to treat a first slot format indicator (SFI), including slot information for the slot including the DU symbol (or according to some aspects, a first slot format indicator (SFI) indicative of the slot including the DU symbol), as an error; a second DU slot interpretation that causes the scheduled entity to treat each DU symbol, of the slot including the DU symbol, as a flexible (F) symbol; a third DU slot interpretation that causes the scheduled entity to treat each DU symbol, of the slot including the DU symbol, as a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, as DL symbols, treat all UL symbols, of the slot including the DU symbol, which are followed by one or more DU symbols, as UL symbols, or treat all F symbols, of the slot including the DU symbol, which are followed by one or more DU symbols as UL symbols; or a fifth DU slot interpretation that causes the scheduled entity to substitute a reserved SFI, having content different from the first SFI, for the first SFI. According to some aspects, the reserved SFI may be indicative of a slot formatted with all DL symbols or all UL symbols.

According to another example, if the duplex mode of the scheduled entity is full-duplex-aware (FD-aware) where the scheduled entity is aware of a full-duplex slot that includes the DU symbol, then at block 1104, selecting the DU slot interpretation may further include selecting at least one of: a first DU slot interpretation that causes the scheduled entity to treat all symbols, of the slot including the DU symbol, as either DL symbols or UL symbols according to a parameter preconfigured in the scheduled entity; a second DU slot interpretation that causes the scheduled entity to treat all symbols, of the slot including the DU symbol, according to an RRC parameter; a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from the first SFI, for the first SFI. According to some aspects, the reserved SFI may be indicative of a slot formatted with all DL symbols or all UL symbols.

For example, the DU slot interpretation selection circuitry 1043, shown and described above in connection with FIG.

10, may provide a means to select the downlink-uplink (DU) slot interpretation to be applied by the scheduled entity to the slot including the DU symbol based on the duplex mode of the scheduled entity.

At block 1106, the scheduling entity may transmit the DU slot interpretation to the scheduled entity. For example, the communication and processing circuitry 1041 and/or the transceiver 1014 and the antenna 1016, shown and described above in connection with FIG. 10, may provide a means to transmit the DU slot interpretation to the scheduled entity.

Figure 12:
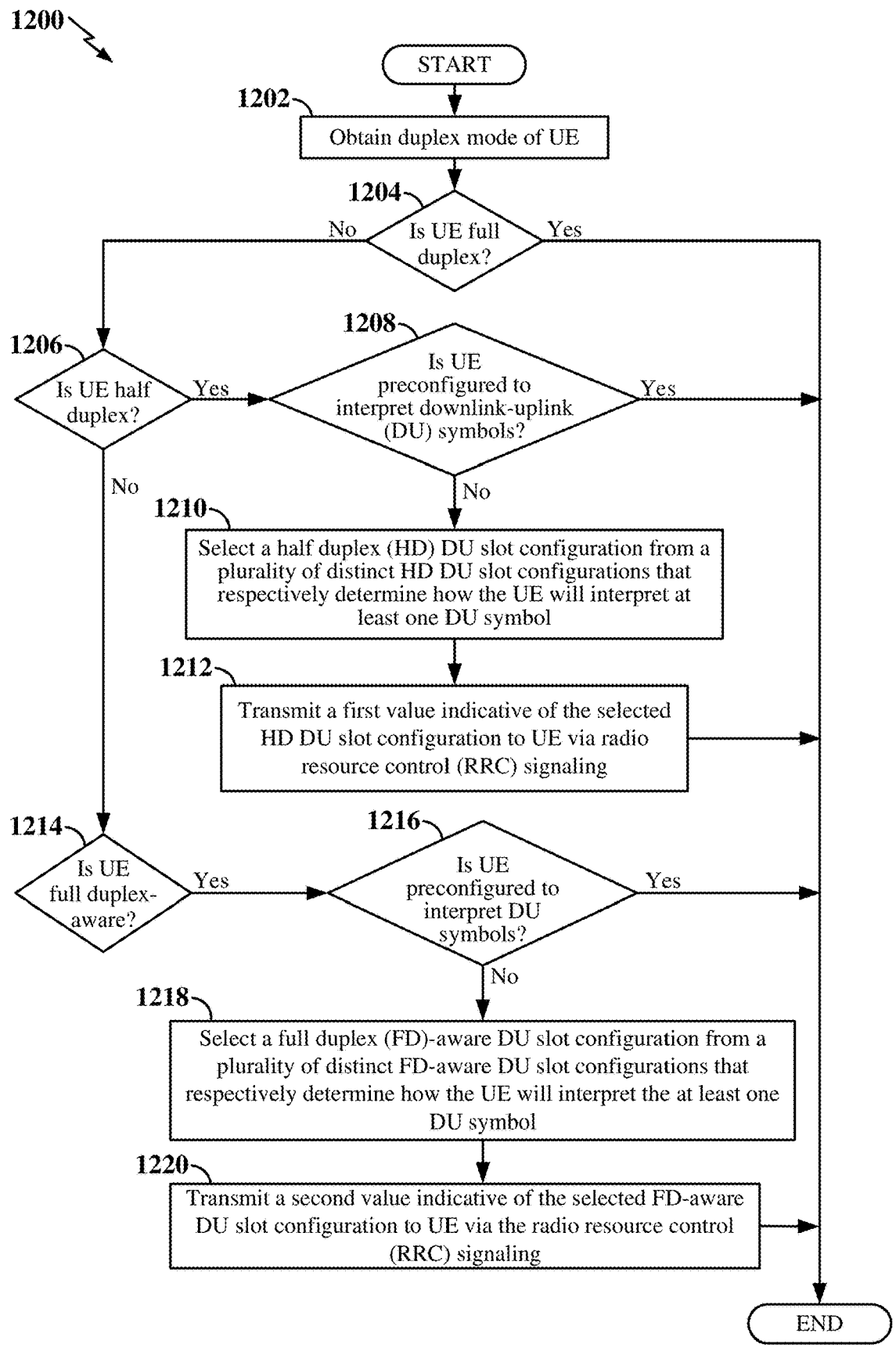
FIG. 12 is a flow chart illustrating another exemplary process (e.g., a method of wireless communication) at a scheduling entity in a wireless communication network according to some aspects of the disclosure.

FIG. 12 is a flow chart illustrating another exemplary process 1200 (e.g., a method of wireless communication) at a scheduling entity in a wireless communication network according to some aspects of the disclosure. The scheduling entity (e.g., a network access node, a base station, a gNB) may configure a slot with at least one downlink-uplink (DU) symbol reserved for a downlink transmission and an uplink transmission. The DU symbol may be configured to include a downlink transmission and an uplink transmission within a same carrier bandwidth (e.g., within a same frequency band). According to some aspects, the DU symbol may be reserved for downlink and uplink transmissions at the same time in the same carrier bandwidth (e.g., of the same frequency band). As described below, some or all illustrated features may be omitted in a particular implementation within the scope of the present disclosure, and some illustrated features may not be required for implementation of all examples. In some examples, the process 1200 may be carried out by the scheduling entity 1000 illustrated in FIG. 10. In some examples, the process 1200 may be carried out by any suitable apparatus or means for carrying out the functions or algorithms described herein.

At block 1202, the scheduling entity may obtain a duplex mode of a scheduled entity (e.g., a UE or other wireless communication device). In some examples, the obtained duplex mode may be half-duplex (HD), full-duplex (FD), or full-duplex-aware (FD-aware); however, the obtained duplex modes are not limited to HD, FD, and FD-aware. For instance, examples of duplex modes may include but are not limited to HD, FD, (FD-aware), frequency division duplex (FDD), time division duplex (TDD), sub-band full-duplex (SBFD) (also referred to as flexible duplex), in-band full-duplex (IBFD), and spatial division duplex (SDD). For example, the communication and processing circuitry 1041, the duplex mode obtaining circuitry 1042, and/or the transceiver 1014 and the antenna 1016, shown and described above in connection with FIG. 10, may provide a means to obtain the duplex mode of a scheduled entity.

At block 1204, the scheduling entity may determine if the obtained duplex mode is full-duplex. If the obtained duplex mode is full-duplex, then the scheduled entity may already be configured to communicate using at least one DU symbol and the process may end. However, if at block 1204, the scheduling entity determines that the obtained duplex mode of the scheduled entity is not full-duplex, the scheduling entity may proceed to block 1206. For example, the communication and processing circuitry 1041, shown and described above in connection with FIG. 10, may provide a means to determine if the obtained duplex mode is full-duplex.

At block 1206, the scheduling entity may determine if the obtained duplex mode of the scheduled entity is half-duplex (HD). If the obtained duplex mode is HD, then at block 1208, the scheduling entity may determine whether the scheduled entity is preconfigured to interpret DU symbols in slot formats. If the scheduling entity determines that the scheduled entity is preconfigured to interpret DU symbols in slot formats, the process may end. However, at block 1208, if the scheduling entity determines that the scheduled entity is not preconfigured to interpret the at least one DU symbol, the scheduling entity may proceed to block 1210. For example, the communication and processing circuitry 1041, shown and described above in connection with FIG. 10, may provide a means to determine if the obtained duplex mode is HD and if the scheduled entity is preconfigured to interpret DU symbols in slot formats.

At block 1210, the scheduling entity may select an HD DU slot interpretation from a plurality of distinct HD DU slot interpretations that respectively determine how the scheduled entity may interpret the at least one DU symbol. For example, the DU slot interpretation selection circuitry 1043 (including HD DU and/or FD-aware DU slot interpretation), shown and described above in connection with FIG. 10, may provide a means to determine how the scheduling entity selects the HD DU slot interpretation from the plurality of distinct HD DU and/or FD-aware DU slot interpretations. Thereafter, at block 1212, the scheduling entity may transmit a first value indicative of the selected HD DU slot interpretation to the scheduled entity via radio resource control (RRC) signaling. For example, the communication and processing circuitry 1041 and/or the transceiver 1014 and the antenna 1016, shown and described above in connection with FIG. 10, may provide a means to transmit the first value indicative of the selected HD DU slot interpretation to the scheduled entity. Thereafter the process may end.

Returning to block 1206, if the scheduling entity determines that the obtained duplex mode of the scheduled entity is not HD, the process may proceed to block 1214. At block 1214, the scheduling entity may determine if the obtained duplex mode is FD-aware. If the obtained duplex mode is FD-aware, then at block 1216, the scheduling entity may determine if the scheduled entity is preconfigured to interpret DU symbols in slot formats. If the scheduled entity is preconfigured to interpret DU symbols in slot formats, the process may end. However, at block 1216, if the scheduling entity determines that the scheduled entity is not preconfigured to interpret the at least one DU symbol, the scheduling entity may proceed to block 1218. For example, the communication and processing circuitry 1041, shown and described above in connection with FIG. 10, may provide a means to determine if the obtained duplex mode of the scheduled entity is not HD, and if the obtained duplex mode is FD-aware, may provide a means to determine if the scheduled entity is preconfigured to interpret DU symbols in slot formats.

At block 1218, the scheduling entity may select an FD-aware DU slot interpretation from a plurality of distinct FD-aware DU slot interpretations that respectively determine how the scheduled entity may interpret the at least one DU symbol. For example, the DU slot interpretation selection circuitry 1043 (including HD DU and/or FD-aware DU slot interpretation), shown and described above in connection with FIG. 10, may provide a means to determine how the scheduling entity selects the FD-aware DU slot interpretation from the plurality of distinct HD DU and/or FD-aware DU slot interpretations. Thereafter, at block 1220, the scheduling entity may transmit a second value indicative of the selected FD-aware DU slot interpretation to the scheduled entity via radio resource control (RRC) signaling. For example, the communication and processing circuitry 1041 and/or the transceiver 1014 and the antenna 1016, shown and described above in connection with FIG. 10, may provide a means to transmit the second value indicative of the selected FD-aware DU slot interpretation to the scheduled entity. Thereafter the process may end.

According to some aspects, the process may further include transmitting downlink control information (DCI) to the scheduled entity, including slot information for the slot including the at least one DU symbol (or according to some aspects, DCI indicative of the slot including the at least one DU symbol). For example, the communication and processing circuitry 1041 and/or the transceiver 1014 and the antenna 1016, shown and described above in connection with FIG. 10, may provide a means to transmit the downlink control information (DCI) to the scheduled entity, According to some aspects, the at least one DU symbol may be different from an uplink (UL) symbol, a downlink (DL) symbol, and a flexible (F) symbol, as the DL symbol and UL symbol are reserved DL and UL transmission, respectively, at the same time at different frequencies or at different times at the same frequency, and the F symbol may be interpreted as either a UL symbol or a DL symbol.

According to some examples, selecting the HD DU slot interpretation from the plurality of distinct HD DU slot interpretations includes selecting at least one of: an HD first DU slot interpretation that causes the scheduled entity to treat a first slot format indicator (SFI), including slot information for a slot including the at least one DU symbol (or according to some aspects, treat the first slot format indicator (SFI), indicative of the slot including the at least one DU symbol), as an error; an HD second DU slot interpretation that causes the scheduled entity to treat each DU symbol including the at least one DU symbol in a slot formatted according to the first SFI, as a flexible (F) symbol; or an HD third DU slot interpretation that causes the scheduled entity to treat each DU symbol including the at least one DU symbol in the slot formatted according to the first SFI, as a downlink (DL) symbol. According to other examples selecting the HD DU slot interpretation from the plurality of distinct HD DU slot interpretations may further include selecting an HD fourth DU slot interpretation that causes the scheduled entity to at least one of: treat all DU symbols, in the slot formatted according to the first SFI, that are followed by one or more DL symbols, as DL symbols, treat all F symbols, in the slot defined by the first SFI, that are followed by one or more DL symbols, and the one or more DU symbols, as DL symbols, treat all UL symbols, in the slot defined by the first SFI, that are followed by one or more DU symbols, as UL symbols, or treat all F symbols, in the slot defined by the first SFI, that are followed by one or more DU symbols, and the one or more DU symbols, as UL symbols; or an HD fifth DU slot interpretation that causes the scheduled entity to substitute a reserved SFI, having content different from the first SFI, for the first SFI. According to some aspects, the reserved SFI may be indicative of a slot formatted with all DL symbols or all UL symbols.

According to still other examples, selecting the FD-aware DU slot interpretation from the plurality of distinct FD-aware DU slot interpretations may include selecting at least one of: an FD-aware first DU slot interpretation that causes the scheduled entity to treat all symbols of a slot associated with a first slot format indicator (SFI), including slot information for a slot including the at least one DU symbol (or according to some aspects, a first slot format indicator (SFI) indicative of a slot including the at least one DU symbol), as either DL symbols or UL symbols according to a parameter preconfigured in the scheduled entity; an FD-aware second DU slot interpretation that causes the scheduled entity to treat all symbols of a slot associated with the first SFI according to an RRC parameter; or an FD-aware third DU slot interpretation that causes the scheduled entity to treat each DU symbol including the at least one DU symbol in the slot formatted according to the first SFI, as a flexible (F) symbol, wherein a physical downlink control channel (PDCCH) determines whether an F symbol is to be treated as an uplink (UL) symbol or a downlink (DL) symbol. Additionally or alternatively, selecting the FD-aware DU slot interpretation from the plurality of distinct FD-aware DU slot interpretations may also include selecting at least one of: an FD-aware fourth DU slot interpretation that causes the scheduled entity to at least one of: treat all DU symbols, in the slot formatted according to the first SFI, that are followed by one or more DL symbols, as DL symbols, treat all F symbols, in the slot defined by the first SFI, that are followed by one or more DL symbols, and the one or more DU symbols, as DL symbols, treat all UL symbols, in the slot defined by the first SFI, that are followed by one or more DU symbols, as UL symbols, or treat all F symbols, in the slot defined by the first SFI, that are followed by one or more DU symbols, and the one or more DU symbols, as UL symbols; or an FD-aware fifth DU slot interpretation that causes the scheduled entity to substitute a reserved SFI, having content different from the first SFI, for the first SFI. According to some aspects, the reserved SFI may be indicative of a slot formatted with all DL symbols or all UL symbols.

In one example, the scheduling entity for wireless communication may include means for obtaining a duplex mode of a scheduled entity in wireless communication with the scheduling entity, means for selecting a downlink-uplink (DU) slot interpretation to be applied by the scheduled entity to a slot including a DU symbol based on the duplex mode of the scheduled entity, and means for transmitting the DU slot interpretation to the scheduled entity. The DU symbol may be configured to include a downlink transmission and an uplink transmission within a same carrier bandwidth (e.g., within a same frequency band). In one aspect, the aforementioned means may be the processor 1004 shown in FIG. 10 and configured to perform the functions recited by the aforementioned means. In another aspect, the aforementioned means may be a circuit, or any apparatus configured to perform the functions recited by the aforementioned means.

In another example, the scheduling entity for wireless communication may include means for obtaining a duplex mode of a scheduled entity, means for selecting an HD DU slot interpretation from a plurality of distinct HD DU slot interpretations that respectively determine how the scheduled entity may interpret the at least one DU symbol (if the duplex mode was HD), and means for transmitting a first value indicative of the selected HD DU slot interpretation to the scheduled entity via radio resource control (RRC) signaling. Still further, the scheduling entity may include means for selecting an FD-aware DU slot interpretation from a plurality of distinct FD-aware DU slot interpretations that respectively determine how the scheduled entity may interpret the at least one DU symbol (if the duplex mode was FD-aware) and means for transmitting a second value indicative of the selected FD-aware DU slot interpretation to the scheduled entity via radio resource control (RRC) signaling. In one aspect, the aforementioned means may be the processor 1004 shown in FIG. 10 and configured to perform the functions recited by the aforementioned means. In another aspect, the aforementioned means may be a circuit, or any apparatus configured to perform the functions recited by the aforementioned means.

Figure 13:
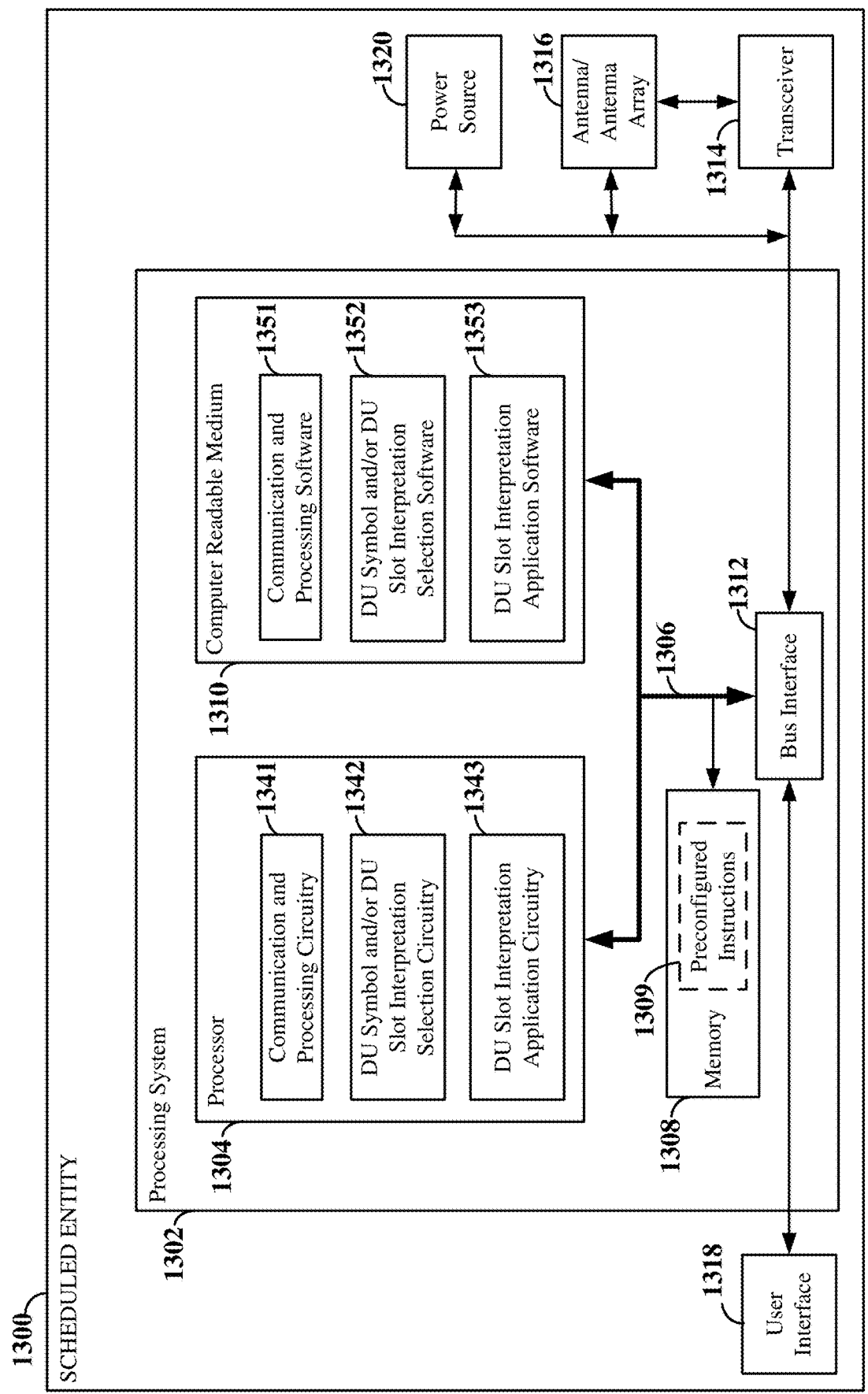
FIG. 13 is a block diagram illustrating an example of a hardware implementation of a scheduled entity employing a processing system according to some aspects of the disclosure.

FIG. 13 is a block diagram illustrating an example of a hardware implementation of scheduled entity 1300 employing a processing system 1302 according to some aspects of the disclosure. For example, the scheduled entity 1300 may be a user equipment (UE) or other scheduled entity as illustrated in any one or more of FIGS. 1, 2, and/or 4.

The processing system 1302 may be substantially the same as the processing system 1002 illustrated in FIG. 10, including a bus interface 1312, a bus 1306, memory 1308, a processor 1304, and a computer-readable medium 1310. In accordance with various aspects of the disclosure, an element, or any portion of an element, or any combination of elements may be implemented with a processing system 1302 that includes one or more processors, such as processor 1304. Furthermore, the scheduled entity 1300 may include a user interface 1318, a transceiver 1314, an antenna/antenna array/antenna module (hereinafter antenna 1316), and a power source 1320 substantially similar to those described above in FIG. 10. The processor 1304, as utilized in a scheduled entity 1300, may be used to implement any one or more of the processes described herein and illustrated, for example, in FIGS. 11, 12, 14 and/or 15. The transceiver 1314 may be a wireless transceiver.

In some aspects of the disclosure, the processor 1304 may include communication and processing circuitry 1341 configured for various functions, including, for example, communicating with a scheduling entity (e.g., a base station, such as a gNB), a network core (e.g., a 5G core network), other scheduled entities, or any other entity, such as, for example, local infrastructure or an entity communicating with the scheduled entity 1300 via the Internet, such as a network provider. In some examples, the communication and processing circuitry 1341 may also be configured to receive and process a message from the scheduling entity, indicating that a slot may be formatted with at least one downlink-uplink (DU) symbol reserved for a downlink transmission and an uplink transmission at the same time in the same carrier bandwidth (e.g., of the same frequency band). In some examples, the communication and processing circuitry 1341 may also be configured to receive and process a message from the scheduling entity, indicating a DU symbol or a DU slot interpretation that the scheduled entity may use to interpret a DU symbol or a DU slot. In some examples, the communication and processing circuitry 1341 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1341 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 1341 may further be configured to execute communication and processing software 1351 stored on the computer-readable medium 1310 to implement one or more functions described herein.

In some aspects of the disclosure, the processor 1304 may include DU symbol and/or DU slot interpretation selection circuitry 1342 configured for various functions, including, for example, selecting a DU symbol and/or DU slot interpretation to use to interpret a DU symbol in a slot and/or a DU slot (including at least one DU symbol), respectively. In some aspects of the disclosure, the DU symbol and/or DU slot interpretation selection circuitry 1342 may be configured for various functions, including, for example, selecting a DU slot interpretation to be applied to the slot including the DU symbol based on a duplex mode of the scheduled entity 1300. The selection may be made in accordance with preconfigured instructions 1309 if the scheduled entity is either an HD or an FD-aware scheduled entity that may be preconfigured to interpret the at least one DU symbol, for example. The preconfigured instructions 1309 may be stored on the memory 1308, for example. According to some aspects, the DU symbol and/or DU slot interpretation selection circuitry 1342 may also receive instructions or other communications (e.g., "first value" or "second value") from the scheduled entity that may indicate one or more DU symbol and/or DU slot interpretations that may be selected and/or used by the scheduled entity to interpret a slot formatted with at least one DU symbol (e.g., a DU slot).

According to some examples, the DU slot interpretations, whether preconfigured with the scheduled entity, transmitted to the scheduled entity by the scheduling entity, determined by the scheduled entity, or obtained in another way, may include, if the duplex mode of the scheduled entity is half-duplex (HD), at least one of: a first DU slot interpretation that causes the scheduled entity to treat a first slot format indicator (SFI), including slot information for a slot including the DU symbol (or according to some aspects, to treat a first slot format indicator (SFI) indicative of a slot including the DU symbol), as an error; a second DU slot interpretation that causes the scheduled entity to treat each DU symbol, in the slot including the DU symbol, as a flexible (F) symbol; a third DU slot interpretation that causes the scheduled entity to treat each DU symbol, in the slot including the DU symbol, as a downlink (DL) symbol; a fourth DU slot interpretation that causes the scheduled entity to at least one of: treat all DU symbols, in the slot including the DU symbol, which are followed by one or more DL symbols, as DL symbols, treat all F symbols, in the slot including the DU symbol, which are followed by one or more DL symbols, as DL symbols, treat all UL symbols, in the slot including the DU symbol, which are followed by one or more DU symbols, as UL symbols, or treat all F symbols, in the slot including the DU symbol, which are followed by one or more DU symbols as UL symbols; or a fifth DU slot interpretation that causes the scheduled entity to substitute a reserved SFI, having content different from the first SFI, for the first SFI.

According to some examples, the DU slot interpretations, whether preconfigured with the scheduled entity, transmitted to the scheduled entity by the scheduling entity, determined by the scheduled entity, or obtained in another way, may include may include, if the duplex mode of the scheduled entity is full-duplex-aware (FD-aware), at least one of: a first DU slot interpretation that causes the scheduled entity to treat all symbols, of the slot including the DU symbol, as either DL symbols or UL symbols according to a parameter preconfigured in the scheduled entity; a second DU slot interpretation that causes the scheduled entity to treat all symbols, of the slot including the DU symbol, according to an RRC parameter; a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from the first SFI, for the first SFI.

In some examples, the DU symbol and/or DU slot interpretation selection circuitry 1342 may include one or more hardware components that provide the physical structure that performs processes related to performing DU symbol and/or DU slot interpretation selection. The DU symbol and/or DU slot interpretation selection circuitry 1342 may further be configured to execute DU symbol and/or DU slot interpretation selection software 1352 stored on the computer-readable medium 1310 to implement one or more functions described herein.

In some aspects of the disclosure, the processor 1304 may include DU slot interpretation application circuitry 1343 configured for various functions, including, for example, applying the DU slot interpretation to the slot, where the DU symbol is configured to include a downlink transmission and an uplink transmission within a same carrier bandwidth (e.g., within a same frequency band). The DU slot interpretation application circuitry 1343 may further be configured to execute DU slot interpretation application processing software 1353 stored on the computer-readable medium 1310 to implement one or more functions described herein.

Figure 14:
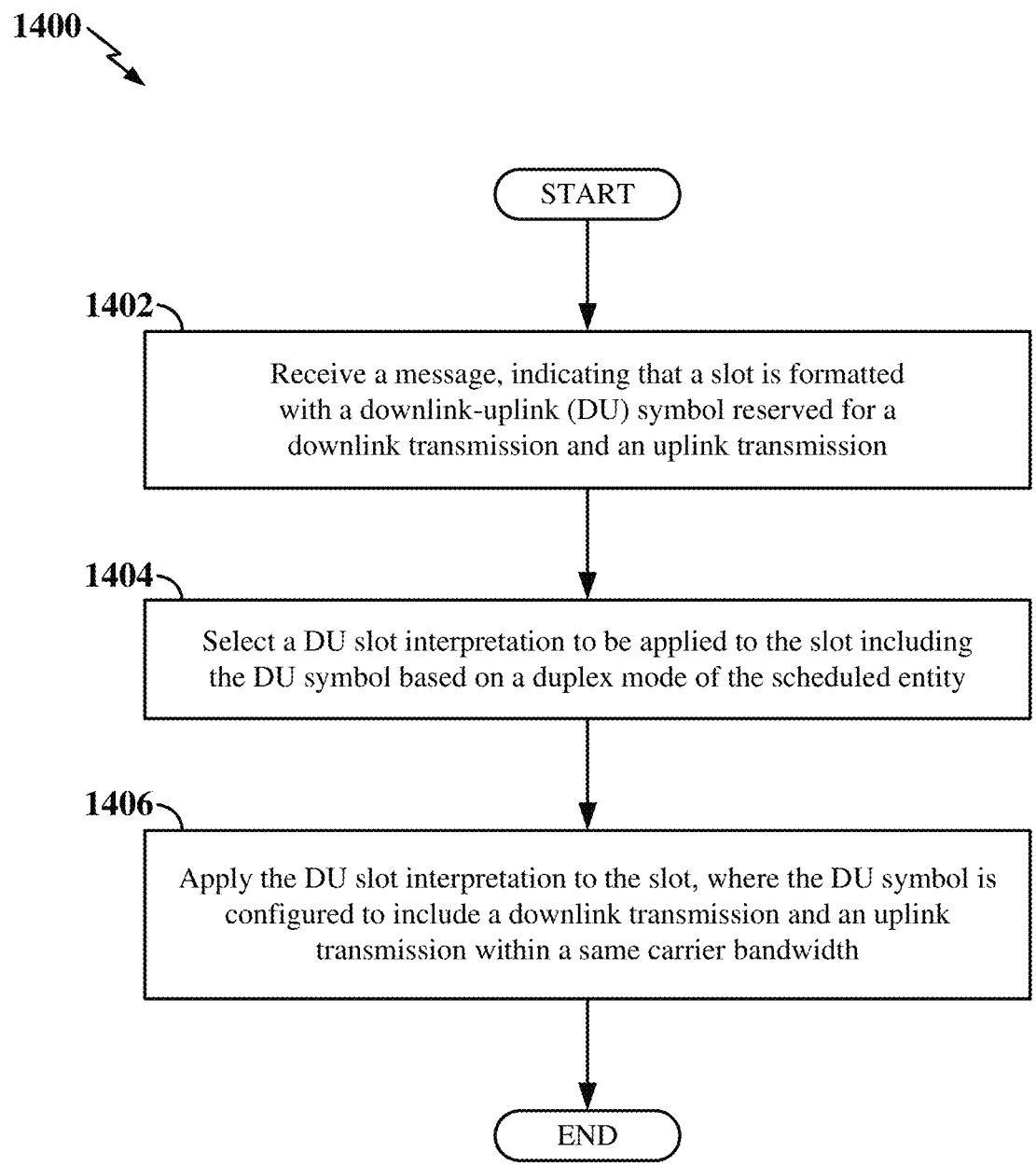
FIG. 14 is a flow chart illustrating an exemplary process (e.g., a method of wireless communication) at a scheduled entity in a wireless communication network according to some aspects of the disclosure.

FIG. 14 is a flow chart illustrating an exemplary process 1400 (e.g., a method of wireless communication) at a scheduled entity in a wireless communication network according to some aspects of the disclosure. According to some aspects, the scheduled entity may be a half-duplex (HD) or a full-duplex (FD)-aware scheduled entity. According to some aspects of the disclosure, the scheduled entity may interpret at least one DU symbol in a slot format. As described below, some or all illustrated features may be omitted in a particular implementation within the scope of the present disclosure, and some illustrated features may not be required for implementation of all examples. In some examples, the process 1400 may be carried out by the scheduled entity 1300 illustrated in FIG. 13. In some examples, the process 1400 may be carried out by any suitable apparatus or means for carrying out the functions or algorithms described herein.

At block 1402, the scheduled entity (e.g., a UE or other wireless communication device) may receive a message indicating that a slot may be formatted with a downlink-uplink (DU) symbol reserved for a downlink transmission and an uplink transmission. The DU symbol may be configured to include the downlink transmission and the uplink transmission within a same carrier bandwidth (e.g., within a same frequency band). The downlink transmission and the uplink transmission may occur at a same time in the same carrier bandwidth (e.g., of the same frequency band). The message may be a downlink control information (DCI) format message, for example. According to one example, the DCI format may be DCI format 2_0. For example, the communication and processing circuitry 1341 and/or the transceiver 1314 and the antenna 1316, shown and described above in connection with FIG. 13, may provide a means to receive a message indicating that a slot may be formatted with a downlink-uplink (DU) symbol reserved for a downlink transmission and an uplink transmission.

At block 1404, the scheduled entity may select a DU slot interpretation to be applied to the slot including the DU symbol based on a duplex mode of the scheduled entity. The DU symbol may be configured to include a downlink transmission and an uplink transmission within a same carrier bandwidth (e.g., within a same frequency band). According to some aspects, the scheduled entity may have been preconfigured with a DU slot interpretation that may be applied to the slot including the DU symbol based on the duplex mode of the scheduled entity; accordingly, selection of the DU slot interpretation, for example, from a plurality of various DU slot interpretations, may not be required. For example, the DU symbol and/or DU slot interpretation selection circuitry 1342 shown and described above in connection with FIG. 13 may provide a means to select a DU slot interpretation to be applied to the slot including the DU symbol based on the duplex mode of the scheduled entity.

At block 1406, the scheduled entity may apply the DU slot interpretation to the slot. For example, the DU slot interpretation application circuitry 1343, shown and described above in connection with FIG. 13, may provide a means to apply the DU slot interpretation to the slot.

According to some aspects, the DU symbol may be different from a downlink (DL) symbol, an uplink (UL) symbol, and a flexible (F) symbol. In one example, the uplink and the downlink may overlap partially or fully within the carrier bandwidth within the DU symbol. In another example, the uplink and the downlink may occur at the same time at different non-overlapping frequencies within the DU symbol. According to some examples, the scheduled entity may receive a first value indicative of the DU slot interpretation to be applied to the slot including the DU symbol, prior to selecting the DU slot interpretation. The first value may be received, for example, from a scheduled entity in RRC signaling.

In some examples, the DL symbol and the UL symbol are reserved for DL and UL, respectively, at: a same first time at different respective first frequencies in paired spectrum, or at different respective second times at a same second frequency. The F symbol may be interpreted as either the UL symbol or the DL symbol. The DU symbol may be reserved for DL and UL at: a same third time at different respective third frequencies in unpaired spectrum (e.g., FIG. 5D, ref. no. 530 or FIG. 6B ref. no. 602), or a same fourth time at a same fourth frequency (e.g., FIG. 6A ref. no. 614), for example, in unpaired spectrum.

In some examples, the different respective first frequencies in the paired spectrum may have a first guard band therebetween. The different respective third frequencies in the unpaired spectrum may have a second guard band therebetween, and the second guard band may be smaller than the first guard band.

In some examples, if the duplex mode of the scheduled entity is half-duplex (HD), then, at block 1404, selecting the DU slot interpretation may further include selecting at least one of: a first DU slot interpretation that causes the scheduled entity to treat a first slot format indicator (SFI), including slot information for a slot including the DU symbol (or according to some aspects, to treat a first slot format indicator (SFI), indicative of a slot including the DU symbol), as an error; a second DU slot interpretation that causes the scheduled entity to treat each DU symbol, in the slot including the DU symbol, as a flexible (F) symbol; a third DU slot interpretation that causes the scheduled entity to treat each DU symbol, in the slot including the DU symbol, as a downlink (DL) symbol; a fourth DU slot interpretation that causes the scheduled entity to at least one of: treat all DU symbols, in the slot including the DU symbol, which are followed by one or more DL symbols, as DL symbols, treat all F symbols, in the slot including the DU symbol, which are followed by one or more DL symbols, as DL symbols, treat all UL symbols, in the slot including the DU symbol, which are followed by one or more DU symbols, as UL symbols, or treat all F symbols, in the slot including the DU symbol, which are followed by one or more DU symbols as UL symbols; or a fifth DU slot interpretation that causes the scheduled entity to substitute a reserved SFI, having content different from the first SFI, for the first SFI. The reserved SFI may be indicative of a slot formatted with all DL symbols or all UL symbols, for example. For example, slot information may include at least one of: slot format indication (SFI), slot format combination identifier (SlotFormatCombinationID), slot format number or ID, symbol type, or symbol location.

According to other examples, if the duplex mode of the scheduled entity is full-duplex-aware (FD-aware), where the scheduled entity is aware of a full-duplex slot that includes the DU symbol. Then, at block 1404 selecting the DU slot interpretation may further include selecting at least one of: a first DU slot interpretation that causes the scheduled entity to treat all symbols, of the slot including the DU symbol, as either DL symbols or UL symbols according to a parameter preconfigured in the scheduled entity; a second DU slot interpretation that causes the scheduled entity to treat all symbols, of the slot including the DU symbol, according to an RRC parameter; a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from a first SFI, for the first SFI. The reserved SFI may be indicative of a slot formatted with all DL symbols or all UL symbols.

Figure 15:
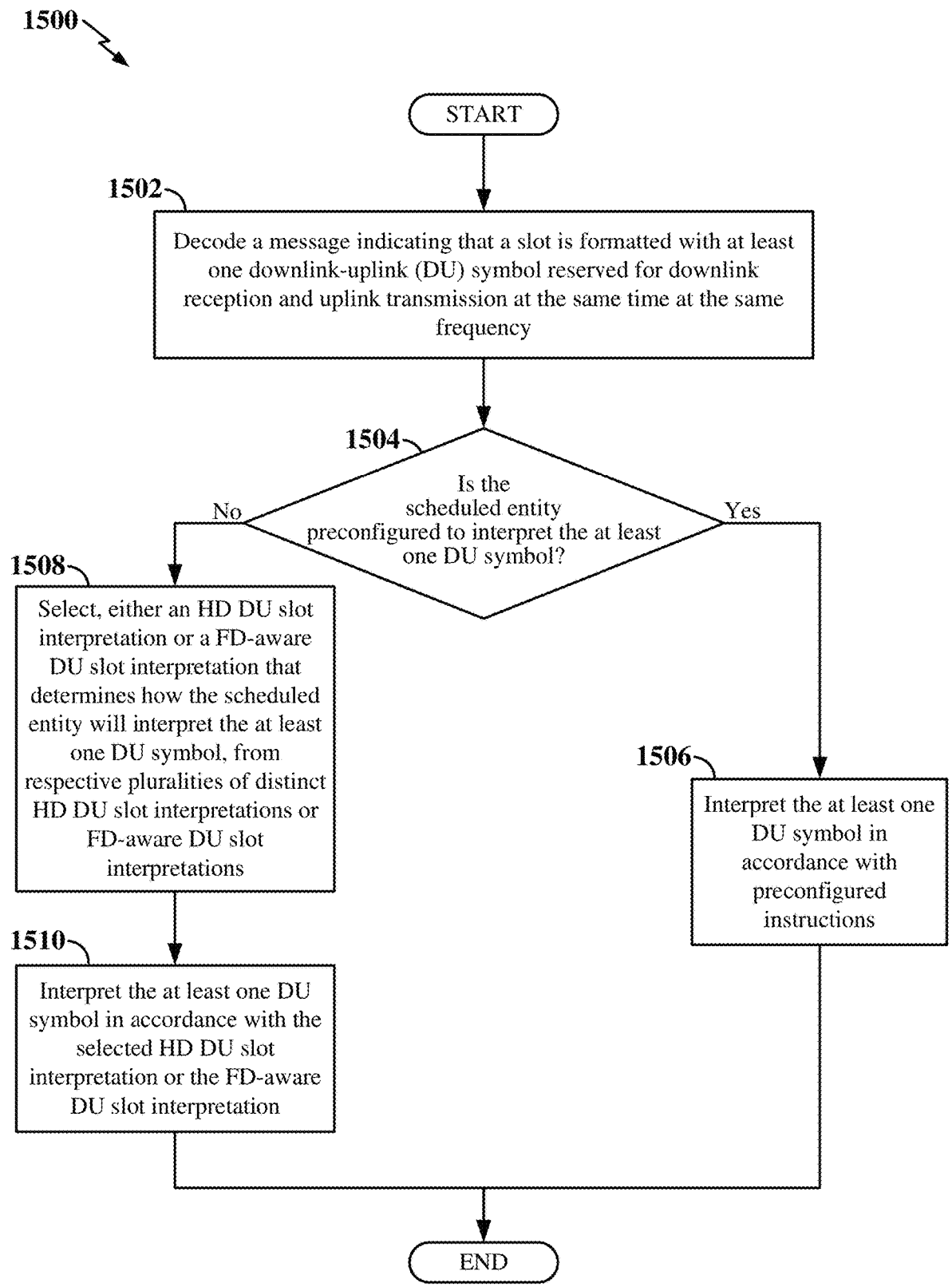
FIG. 15 is a flow chart illustrating another exemplary process (e.g., a method of wireless communication) at a scheduled entity in a wireless communication network according to some aspects of the disclosure.

FIG. 15 is a flow chart illustrating another exemplary process 1500 (e.g., a method of wireless communication) at a scheduled entity in a wireless communication network according to some aspects of the disclosure. According to some aspects, the scheduled entity may be a half-duplex (HD) or a full-duplex (FD)-aware scheduled entity. According to some aspects of the disclosure, the scheduled entity may interpret at least one DU symbol in a slot format. As described below, some or all illustrated features may be omitted in a particular implementation within the scope of the present disclosure, and some illustrated features may not be required for implementation of all examples. In some examples, the process 1500 may be carried out by the scheduled entity 1300 illustrated in FIG. 13. In some examples, the process 1500 may be carried out by any suitable apparatus or means for carrying out the functions or algorithms described herein.

At block 1502, the scheduled entity (e.g., a UE or other wireless communication device) may receive a message indicating that a slot may be formatted with at least one downlink-uplink (DU) symbol reserved for a downlink transmission and an uplink transmission at the same time in the same carrier bandwidth (e.g., of the same frequency band). The message may be a downlink control information (DCI) format message, for example. According to one example, the DCI format may be DCI format 2_0. For example, the communication and processing circuitry 1341 and/or the transceiver 1314 and the antenna 1316, shown and described above in connection with FIG. 13, may provide a means to receive a message indicating that a slot may be formatted with at least one downlink-uplink (DU) symbol reserved for a downlink transmission and an uplink transmission at the same time in the same carrier bandwidth (e.g., of the same frequency band).

A block 1504, the scheduled entity may determine if it is preconfigured to interpret the at least one DU symbol. For example, the communication and processing circuitry 1341 and the memory 1308, shown and described above in connection with FIG. 13, may provide a means for determining if the scheduled entity is preconfigured to interpret the at least one DU symbol. Preconfigured instructions 1309 may, for example, be stored in the memory 1308.

If the scheduled entity is preconfigured to interpret the at least one DU symbol, then, at block 1506, the scheduled entity may interpret the at least one DU symbol in accordance with the preconfigured instructions. For example, the DU symbol and/or DU slot interpretation selection circuitry 1342, shown and described above in connection with FIG. 13, may provide a means for interpreting the at least one DU symbol in accordance with the preconfigured instructions.

If the scheduled entity is not preconfigured to interpret the at least one DU symbol, then, at block 1508, the scheduled entity may select either an HD DU slot interpretation or an FD-aware DU slot interpretation that determines how the scheduled entity may interpret the at least one DU symbol. The selection may be made from respective pluralities of distinct HD DU slot interpretations or FD-aware DU slot interpretations. For example, the DU symbol and/or DU slot interpretation selection circuitry 1342, shown and described above in connection with FIG. 13, may provide a means for selecting either an HD DU slot interpretation or an FD-aware DU slot interpretation that determines how the scheduled entity may interpret the at least one DU symbol.

At block 1510, the scheduled entity may interpret the at least one DU symbol in accordance with the selected HD DU interpretation of the FD-aware DU interpretation selected at block 1508. For example, the DU symbol and/or DU slot interpretation selection circuitry 1342, shown and described above in connection with FIG. 13, may provide a means for interpreting interpret the at least one DU symbol in accordance with the selected HD DU interpretation of the FD-aware DU interpretation selected at block 1508.

According to some aspects, the scheduled entity may further receive a first value indicative of the DU slot interpretation to be applied to the slot including the DU symbol, prior to selecting the DU slot interpretation. According to one example, the first value may be received via radio resource control (RRC) signaling.

According to one example, if the duplex mode of the scheduled entity is half-duplex (HD), selecting the DU slot interpretation may include selecting at least one of: a first DU slot interpretation that causes the scheduled entity to treat a first slot format indicator (SFI), including slot information for a slot including the DU symbol (or according to some aspects, to treat a first slot format indicator (SFI) indicative of a slot including the DU symbol), as an error; a second DU slot interpretation that causes the scheduled entity to treat each DU symbol, in the slot including the DU symbol, as a flexible (F) symbol; a third DU slot interpretation that causes the scheduled entity to treat each DU symbol, in the slot including the DU symbol, as a downlink (DL) symbol; a fourth DU slot interpretation that causes the scheduled entity to at least one of: treat all DU symbols, in the slot including the DU symbol, which are followed by one or more DL symbols, as DL symbols, treat all F symbols, in the slot including the DU symbol, which are followed by one or more DL symbols, as DL symbols, treat all UL symbols, in the slot including the DU symbol, which are followed by one or more DU symbols, as UL symbols, or treat all F symbols, in the slot including the DU symbol, which are followed by one or more DU symbols as UL symbols; or a fifth DU slot interpretation that causes the scheduled entity to substitute a reserved SFI, having content different from the first SFI, for the first SFI. According to one aspect, the reserved SFI may be indicative of a slot formatted with all DL symbols or all UL symbols.

According to another example, if the duplex mode of the scheduled entity is full-duplex-aware (FD-aware), selecting the DU slot interpretation may include selecting at least one of: a first DU slot interpretation that causes the scheduled entity to treat all symbols, of the slot including the DU symbol, as either DL symbols or UL symbols according to a parameter preconfigured in the scheduled entity; a second DU slot interpretation that causes the scheduled entity to treat all symbols, of the slot including the DU symbol, according to an RRC parameter; a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from a first SFI, for the first SFI. According to one aspect, the reserved SFI may be indicative of a slot formatted with all DL symbols or all UL symbols.

The exemplary process 1500 may further include, for example, receiving a first value indicative of the DU slot interpretation that determines how the scheduled entity may interpret the at least one DU symbol if the scheduled entity is not preconfigured to interpret the at least one DU symbol. The received first value may indicate, for example, one of five alternative DU slot interpretations. The exemplary process may further include receiving the first value via RRC signaling.

According to some aspects, the at least one DU symbol may be different from an uplink (UL) symbol, a downlink (DL) symbol, and a flexible (F) symbol, as the DL symbol and UL symbol are reserved for DL and UL transmission, respectively, at the same time at different frequencies or at different times at the same frequency, and the F symbol may be interpreted as either a UL symbol or a DL symbol.

In one example, if the scheduled entity is an HD scheduled entity, the preconfigured instructions may cause the wireless device to at least one of: treat a first slot format indicator (SFI), including slot information for a slot including the at least one DU symbol (or according to some aspects, treat a first slot format indicator (SFI) indicative of a slot including the at least one DU symbol), as an error; treat each DU symbol in a slot formatted according to the first SFI, as a flexible (F) symbol; treat each DU symbol in the slot formatted according to the first SFI, as a downlink (DL) symbol; or may further cause the scheduled entity to at least one of: treat all DU symbols, in the slot formatted according to the first SFI, that are followed by one or more DL symbols, as DL symbols, treat all F symbols, in the slot defined by the first SFI, that are followed by one or more DL symbols, and the one or more DU symbols, as DL symbols, treat all UL symbols, in the slot defined by the first SFI, that are followed by one or more DU symbols, as UL symbols, or treat all F symbols, in the slot defined by the first SFI, that are followed by one or more DU symbols, and the one or more DU symbols, as UL symbols; or further may cause the scheduled entity to substitute a reserved SFI, having content different from the first SFI, for the first SFI. According to some aspects, the reserved SFI may be indicative of a slot formatted with all DL symbols or all UL symbols.

In another example, if the scheduled entity is a half-duplex scheduled entity, the plurality of distinct HD DU slot interpretations may include at least one of: an HD first DU slot interpretation that causes the scheduled entity to treat a first slot format indicator (SFI), including slot information for a slot including the at least one DU symbol (or according to some aspects, to treat a first slot format indicator (SFI) indicative of a slot including the at least one DU symbol), as an error; an HD second DU slot interpretation that causes the scheduled entity to treat each DU symbol in a slot formatted according to the first SFI, as a flexible (F) symbol; an HD third DU slot interpretation that causes the scheduled entity to treat each DU symbol in the slot formatted according to the first SFI, as a downlink (DL) symbol; an HD fourth DU slot interpretation that causes the scheduled entity to at least one of: treat all DU symbols, in the slot formatted according to the first SFI, that are followed by one or more DL symbols, as DL symbols, treat all F symbols, in the slot defined by the first SFI, that are followed by one or more DL symbols, and the one or more DU symbols, as DL symbols, treat all UL symbols, in the slot defined by the first SFI, that are followed by one or more DU symbols, as UL symbols, or treat all F symbols, in the slot defined by the first SFI, that are followed by one or more DU symbols, and the one or more DU symbols, as UL symbols; or an HD fifth DU slot interpretation that causes the scheduled entity to substitute a reserved SFI, having content different from the first SFI, for the first SFI. According to some aspects, the reserved SFI may be indicative of a slot formatted with all DL symbols or all UL symbols.

According to one aspect, if the scheduled entity is the FD-aware scheduled entity, the preconfigured instructions may cause the scheduled entity to operate in either a UL mode or a DL mode depending, for example, on at least one of: a default mode preconfigured in the scheduled entity; an RRC parameter that determines whether the at least one DU symbol may be replaced by either a DL symbol or a UL symbol; a PDCCH that is monitored to determine whether the at least one DU symbol may be replaced by either a DL symbol or a UL symbol; a DU slot interpretation that causes the scheduled entity to replace a first SFI with a reserved SFI used with the FD-aware scheduled entity; or a DU slot interpretation that causes the scheduled entity to at least one of: treat all DU symbols, in the slot formatted according to the first SFI, that are followed by one or more DL symbols, as DL symbols, treat all F symbols, in the slot defined by the first SFI, that are followed by one or more DL symbols, and the one or more DU symbols, as DL symbols, treat all UL symbols, in the slot defined by the first SFI, that are followed by one or more DU symbols, as UL symbols, or treat all F symbols, in the slot defined by the first SFI, that are followed by one or more DU symbols, and the one or more DU symbols, as UL symbols. In one example, the reserved SFI may be indicative of a slot formatted with all DL symbols or all UL symbols.

In another example, if the scheduled entity is the FD-aware scheduled entity, the plurality of distinct FD-aware DU slot interpretations may include, for example, at least one of: an FD-aware first DU slot interpretation based on a default mode preconfigured in the scheduled entity; an FD-aware second DU slot interpretation based on an RRC parameter that determines whether the at least one DU symbol may be replaced by either a DL symbol or a UL symbol; an FD-aware third DU slot interpretation based on a PDCCH that may be monitored to determine whether the at least one DU symbol may be replaced by either a DL symbol or a UL symbol; an FD-aware fourth DU slot interpretation that causes the scheduled entity to replace a first SFI with a reserved SFI used with the FD-aware scheduled entity; or an FD-aware fifth DU slot interpretation that causes the scheduled entity to at least one of: treat all DU symbols, in the slot formatted according to the first SFI, that are followed by one or more DL symbols, as DL symbols, treat all F symbols, in the slot defined by the first SFI, that are followed by one or more DL symbols, and the one or more DU symbols, as DL symbols, treat all UL symbols, in the slot defined by the first SFI, that are followed by one or more DU symbols, as UL symbols, or treat all F symbols, in the slot defined by the first SFI, that are followed by one or more DU symbols, and the one or more DU symbols, as UL symbols. According to some aspects, the reserved SFI may be indicative of a slot formatted with all DL symbols or all UL symbols.

According to some aspects, for FD-aware and FD scheduled entities, a DU slot identified in a DCI Format 2_0 message may have some FDD-like behavior. For example, the patterns of slot formats (e.g., the patterns of three slot formats for a given SlotFormatCombinationID 802 of FIG. 8) may repeat. In another example, the DU slot interpretation after receiving the DCI 2_0 may override a common or dedicated slot pattern configuration. That is, the SFI may override the common or dedicated slot pattern configuration, which is an RRC configuration. According to other aspects, for FD-aware and FD scheduled entities, a DU slot identified in a DCI Format 2_0 message may have some TDD-like behavior. For example, PDCCH monitoring may determine periodicity and length of slots (as performed in a TDD duplex mode) to obtain an upcoming pattern of slot formats. In another example, a newly obtained SFI may override flexible slots or flexible symbols defined by an existing SFI with indicated slots or symbols, respectively defined in the newly obtained SFI.

In one example, the scheduled entity may include means for receiving a message, indicating that a slot may be formatted with a downlink-uplink (DU) symbol reserved for a downlink transmission and an uplink transmission, at the same time in the same carrier bandwidth (e.g., of the same frequency band), means for selecting a DU slot interpretation to be applied to the slot including the DU symbol based on a duplex mode of the scheduled entity, and means for applying the DU slot interpretation to the slot, where the DU symbol may be configured to include a downlink transmission and an uplink transmission within a same carrier bandwidth (e.g., within a same frequency band).

In another example, the scheduled entity may include and means for decoding a message indicating that a slot is formatted with at least one downlink-uplink (DU) symbol reserved for a downlink transmission and an uplink transmission at the same time in the same carrier bandwidth (e.g., of the same frequency band), means for determining if the scheduled entity is preconfigured to interpret the at least one DU symbol. If the scheduled entity is preconfigured to interpret the at least one DU symbol, the scheduled entity may further include means for interpreting the at least one DU symbol in accordance with preconfigured instructions. If the scheduled entity is not preconfigured to interpret the at least one DU symbol, the scheduled entity may further include means for selecting, either an HD DU slot interpretation or an FD-aware DU slot interpretation that determines how the scheduled entity may interpret the at least one DU symbol, from respective pluralities of distinct HD DU slot interpretations or FD-aware DU slot interpretations.

In one aspect, the aforementioned means may be the processor 1304 shown in FIG. 13 and configured to perform the functions recited by the aforementioned means. In another aspect, the aforementioned means may be a circuit, or any apparatus configured to perform the functions recited by the aforementioned means.

Of course, in the above examples, the circuitry included in the processor 1004 and/or 1304 is merely provided as an example, and other means for carrying out the described functions may be included within various aspects of the present disclosure, including but not limited to the instructions stored in the computer-readable medium 1010 of FIG. 10 and/or 1310 of FIG. 13, or any other suitable apparatus or means described in any one of the FIGS. 1, 2, 4, 7, 10, and/or 13, and utilizing, for example, the processes and/or algorithms described herein in relation to FIGS. 11, 12, 14 and/or 15.

The following provides an overview of the present disclosure:

Aspect 1: A method of wireless communication, at a scheduling entity in a wireless communication network, the method comprising: obtaining a duplex mode of a scheduled entity in wireless communication with the scheduling entity; selecting a downlink-uplink (DU) slot interpretation to be applied by the scheduled entity to a slot including a DU symbol based on the duplex mode of the scheduled entity; and transmitting the DU slot interpretation to the scheduled entity, wherein the DU symbol is configured to include a downlink transmission and an uplink transmission within a same carrier bandwidth.

Aspect 2: The method of aspect 1, further comprising: transmitting downlink control information (DCI) to the scheduled entity comprising slot information for the slot including the DU symbol.

Aspect 3: The method of aspect 1 or 2, wherein the uplink transmission and the downlink transmission overlap partially or fully within the carrier bandwidth within the DU symbol.

Aspect 4: The method of aspect 1 or 2, wherein the uplink transmission and the downlink transmission occur at a same time at different non-overlapping frequencies within the DU symbol.

Aspect 5: The method of any of aspects 1 through 4, wherein the duplex mode of the scheduled entity is half-duplex (HD), and selecting the DU slot interpretation further comprises selecting at least one of: a first DU slot interpretation that causes the scheduled entity to treat a first slot format indicator (SFI), comprising slot information for the slot including the DU symbol, as an error; a second DU slot interpretation that causes the scheduled entity to treat each DU symbol, of the slot including the DU symbol, as a flexible (F) symbol; a third DU slot interpretation that causes the scheduled entity to treat each DU symbol, of the slot including the DU symbol, as a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from the first SFI, for the first SFI.

Aspect 6: The method of aspect 5, wherein the reserved SFI is indicative of the slot formatted with all DL symbols or all UL symbols.

Aspect 7: The method of any of aspects 1 through 6, wherein the duplex mode of the scheduled entity is full-duplex-aware (FD-aware) where the scheduled entity is aware of a full-duplex slot that includes the DU symbol and selecting the DU slot interpretation further comprises selecting at least one of: a first DU slot interpretation that causes the scheduled entity to treat all symbols, of the slot including the DU symbol, as either DL symbols or UL symbols according to a parameter preconfigured in the scheduled entity; a second DU slot interpretation that causes the scheduled entity to treat all symbols, of the slot including the DU symbol, according to an RRC parameter; a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from a first SFI, for the first SFI.

Aspect 8: The method of aspect 7 wherein the reserved SFI is indicative of the slot formatted with all DL symbols or all UL symbols.

Aspect 9: A method of wireless communication, at a scheduled entity, in a wireless communication network, the method comprising: receiving a message, indicating that a slot is formatted with a downlink-uplink (DU) symbol reserved for a downlink transmission and an uplink transmission; selecting a DU slot interpretation to be applied to the slot including the DU symbol based on a duplex mode of the scheduled entity; and applying the DU slot interpretation to the slot, wherein the DU symbol is configured to include the downlink transmission and the uplink transmission within a same carrier bandwidth.

Aspect 10: The method of aspect 9, further comprising, receiving a first value indicative of the DU slot interpretation to be applied to the slot including the DU symbol prior to selecting the DU slot interpretation.

Aspect 11: The method of aspect 9 or 10, wherein the uplink transmission and the downlink transmission overlap partially or fully within the carrier bandwidth within the DU symbol.

Aspect 12: The method of aspect 9 or 10, wherein the uplink transmission and the downlink transmission occur at a same time at different non-overlapping frequencies within the DU symbol.

Aspect 13: The method of any of aspects 9 through 12, wherein the duplex mode of the scheduled entity is half-duplex (HD), and selecting the DU slot interpretation further comprises selecting at least one of: a first DU slot interpretation that causes the scheduled entity to treat a first slot format indicator (SFI), comprising slot information for the slot including the DU symbol, as an error; a second DU slot interpretation that causes the scheduled entity to treat each DU symbol, in the slot including the DU symbol, as a flexible (F) symbol; a third DU slot interpretation that causes the scheduled entity to treat each DU symbol, in the slot including the DU symbol, as a downlink (DL) symbol; a fourth DU slot interpretation that causes the scheduled entity to at least one of: treat all DU symbols, in the slot including the DU symbol, which are followed by one or more DL symbols, as DL symbols, treat all F symbols, in the slot including the DU symbol, which are followed by one or more DL symbols, as DL symbols, treat all UL symbols, in the slot including the DU symbol, which are followed by one or more DU symbols, as UL symbols, or treat all F symbols, in the slot including the DU symbol, which are followed by one or more DU symbols as UL symbols; or a fifth DU slot interpretation that causes the scheduled entity to substitute a reserved SFI, having content different from the first SFI, for the first SFI.

Aspect 14: The method of aspect 13, wherein the reserved SFI is indicative of the slot formatted with all DL symbols or all UL symbols.

Aspect 15: The method of any of aspects 9 through 14, wherein the duplex mode of the scheduled entity is full-duplex-aware (FD-aware) where the scheduled entity is aware of a full-duplex slot that includes the DU symbol and selecting the DU slot interpretation further comprises selecting at least one of: a first DU slot interpretation that causes the scheduled entity to treat all symbols, of the slot including the DU symbol, as either DL symbols or UL symbols according to a parameter preconfigured in the scheduled entity; a second DU slot interpretation that causes the scheduled entity to treat all symbols, of the slot including the DU symbol, according to an RRC parameter; a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol; a fourth DU slot interpretation that causes the scheduled entity to at least one of: treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from a first SFI, for the first SFI.

Aspect 16: The method of aspect 15 wherein the reserved SFI is indicative of the slot formatted with all DL symbols or all UL symbols.

Aspect 17: An apparatus configured for wireless communication in a wireless communication network, comprising: a wireless transceiver; a memory; and a processor communicatively coupled to the wireless transceiver and the memory, wherein the processor and the memory are configured to: perform a method of any one of aspects 1 through 8 or 9 through 16.

Aspect 18: An apparatus configured for wireless communication in a wireless communication network, comprising at least one means for performing a method of any one of aspects 1 through 8 or 9 through 16.

Aspect 31: A non-transitory computer-readable medium storing computer-executable code, comprising code for causing an apparatus to perform a method of any one of aspects 1 through 8 or 9 through 16.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Likewise, a phrase referring to "a and/or b" is intended to cover: a; b; and a and b. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, at a scheduling entity in a wireless communication network, the method comprising:
    obtaining a duplex mode of a scheduled entity in wireless communication with the scheduling entity;
    selecting a downlink-uplink (DU) slot interpretation to be applied by the scheduled entity to a full-duplex slot including a DU symbol based on the duplex mode of the scheduled entity; and
    transmitting the DU slot interpretation to the scheduled entity,
    wherein the DU symbol is configured to include a downlink transmission and an uplink transmission within a same carrier bandwidth in an operating band designated for time division duplex half-duplex (TDD HD) operation.

2. The method of claim 1, further comprising:
    transmitting downlink control information (DCI) to the scheduled entity comprising slot information for the slot including the DU symbol.

3. The method of claim 1, wherein the uplink transmission and the downlink transmission overlap partially or fully within the carrier bandwidth within the DU symbol.

4. The method of claim 1, wherein the uplink transmission and the downlink transmission occur at a same time at different non-overlapping frequencies within the DU symbol.

5. The method of claim 1, wherein the duplex mode of the scheduled entity is half-duplex (HD), and selecting the DU slot interpretation further comprises selecting at least one of:
- a first DU slot interpretation that causes the scheduled entity to treat a first slot format indicator (SFI), comprising slot information for the slot including the DU symbol, as an error;
- a second DU slot interpretation that causes the scheduled entity to treat each DU symbol, of the slot including the DU symbol, as a flexible (F) symbol;
- a third DU slot interpretation that causes the scheduled entity to treat each DU symbol, of the slot including the DU symbol, as a downlink (DL) symbol;
- a fourth DU slot interpretation that causes the scheduled entity to at least one of:
  - treat all DU symbols, of the slot including the DU symbol, which are followed by one or more DL symbols, as DL symbols,
  - treat all F symbols, of the slot including the DU symbol, which are followed by one or more DL symbols, as DL symbols,
  - treat all UL symbols, of the slot including the DU symbol, which are followed by one or more DU symbols, as UL symbols, or
  - treat all F symbols, of the slot including the DU symbol, which are followed by one or more DU symbols, as UL symbols; or
- a fifth DU slot interpretation that causes the scheduled entity to substitute a reserved SFI, having content different from the first SFI, for the first SFI.

6. The method of claim 5, wherein the reserved SFI is indicative of the slot formatted with all DL symbols or all UL symbols.

7. The method of claim 1, wherein the duplex mode of the scheduled entity is full-duplex-aware (FD-aware) where the scheduled entity is aware of a full-duplex slot that includes the DU symbol and selecting the DU slot interpretation further comprises selecting at least one of:
- a first DU slot interpretation that causes the scheduled entity to treat all symbols, of the slot including the DU symbol, as either DL symbols or UL symbols according to a parameter preconfigured in the scheduled entity;
- a second DU slot interpretation that causes the scheduled entity to treat all symbols, of the slot including the DU symbol, according to an RRC parameter;
- a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol;
- a fourth DU slot interpretation that causes the scheduled entity to at least one of:
  - treat all DU symbols, of the slot including the DU symbol, which are followed by one or more DL symbols, as DL symbols,
  - treat all F symbols, of the slot including the DU symbol, which are followed by one or more DL symbols, and the one or more DU symbols, as DL symbols,
  - treat all UL symbols, of the slot including the DU symbol, which are followed by one or more DU symbols, as UL symbols, or
  - treat all F symbols, of the slot including the DU symbol, which are followed by one or more DU symbols, as UL symbols; or
- a fifth DU slot interpretation that causes the scheduled entity to substitute a reserved SFI, having content different from a first SFI, for the first SFI.

8. The method of claim 7 wherein the reserved SFI is indicative of the slot formatted with all DL symbols or all UL symbols.

9. A scheduling entity in a wireless communication network, comprising:
- a wireless transceiver;
- a memory; and
- a processor communicatively coupled to the wireless transceiver and the memory, wherein the processor and the memory are configured to:
  - obtain a duplex mode of a scheduled entity in wireless communication with the scheduling entity;
  - select a downlink-uplink (DU) slot interpretation to be applied by the scheduled entity to a full-duplex slot including a DU symbol based on the duplex mode of the scheduled entity; and
  - transmit the DU slot interpretation to the scheduled entity,
  - wherein the DU symbol is configured to include a downlink transmission and an uplink transmission within a same carrier bandwidth in an operating band designated for time division duplex half-duplex (TDD HD) operation.

10. The scheduling entity of claim 9, wherein the processor and memory are further configured to:
- transmit downlink control information (DCI) to the scheduled entity, including DCI comprising slot information for the slot including the DU symbol.

11. The scheduling entity of claim 9, wherein the uplink transmission and the downlink transmission overlap partially or fully within the carrier bandwidth within the DU symbol.

12. The scheduling entity of claim 9, wherein the uplink transmission and the downlink transmission occur at a same time at different non-overlapping frequencies within the DU symbol.

13. The scheduling entity of claim 9, wherein the duplex mode of the scheduled entity is half-duplex (HD), and to select the DU slot interpretation, the processor and memory are further configured to select at least one of:
- a first DU slot interpretation that causes the scheduled entity to treat a first slot format indicator (SFI), comprising slot information for the slot including the DU symbol, as an error;
- a second DU slot interpretation that causes the scheduled entity to treat each DU symbol, of the slot including the DU symbol, as a flexible (F) symbol;
- a third DU slot interpretation that causes the scheduled entity to treat each DU symbol, of the slot including the DU symbol, as a downlink (DL) symbol;
- a fourth DU slot interpretation that causes the scheduled entity to at least one of:
  - treat all DU symbols, of the slot including the DU symbol, which are followed by one or more DL symbols, as DL symbols,
  - treat all F symbols, of the slot including the DU symbol, which are followed by one or more DL symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from the first SFI, for the first SFI.

14. The scheduling entity of claim 13, wherein the reserved SFI is indicative of the slot formatted with all DL symbols or all UL symbols.

15. The scheduling entity of claim 9, wherein the duplex mode of the scheduled entity is full-duplex-aware (FD-aware) where the scheduled entity is aware of a full-duplex slot that includes the DU symbol, and to select the DU slot interpretation, the processor and memory are further configured to select at least one of:

a first DU slot interpretation that causes the scheduled entity to treat all symbols, of the slot including the DU symbol, as either DL symbols or UL symbols according to a parameter preconfigured in the scheduled entity;

a second DU slot interpretation that causes the scheduled entity to treat all symbols, of the slot including the DU symbol, according to an RRC parameter;

a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol;

a fourth DU slot interpretation that causes the scheduled entity to at least one of:

treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from a first SFI, for the first SFI.

16. A method of wireless communication, at a scheduled entity, in a wireless communication network, the method comprising:

receiving a message, indicating that a full-duplex slot is formatted with a downlink-uplink (DU) symbol reserved for a downlink transmission and an uplink transmission;

selecting a DU slot interpretation to be applied to the full-duplex slot including the DU symbol based on a duplex mode of the scheduled entity; and applying the DU slot interpretation to the full-duplex slot, wherein the DU symbol is configured to include the downlink transmission and the uplink transmission within a same carrier bandwidth in an operating band designated for time division duplex half-duplex (TDD HD) operation.

17. The method of claim 16, further comprising, receiving a first value indicative of the DU slot interpretation to be applied to the slot including the DU symbol prior to selecting the DU slot interpretation.

18. The method of claim 16, wherein the uplink transmission and the downlink transmission overlap partially or fully within the carrier bandwidth within the DU symbol.

19. The method of claim 16, wherein the uplink transmission and the downlink transmission occur at a same time at different non-overlapping frequencies within the DU symbol.

20. The method of claim 16, wherein the duplex mode of the scheduled entity is half-duplex (HD), and selecting the DU slot interpretation further comprises selecting at least one of:

a first DU slot interpretation that causes the scheduled entity to treat a first slot format indicator (SFI), comprising slot information for the slot including the DU symbol, as an error;

a second DU slot interpretation that causes the scheduled entity to treat each DU symbol, in the slot including the DU symbol, as a flexible (F) symbol;

a third DU slot interpretation that causes the scheduled entity to treat each DU symbol, in the slot including the DU symbol, as a downlink (DL) symbol;

a fourth DU slot interpretation that causes the scheduled entity to at least one of:

treat all DU symbols, in the slot including the DU symbol, which are followed by one or more DL symbols, as DL symbols, treat all F symbols, in the slot including the DU symbol, which are followed by one or more DL symbols, as DL symbols, treat all UL symbols, in the slot including the DU symbol, which are followed by one or more DU symbols, as UL symbols, or treat all F symbols, in the slot including the DU symbol, which are followed by one or more DU symbols as UL symbols; or a fifth DU slot interpretation that causes the scheduled entity to substitute a reserved SFI, having content different from the first SFI, for the first SFI.

21. The method of claim 20, wherein the reserved SFI is indicative of the slot formatted with all DL symbols or all UL symbols.

22. The method of claim 16, wherein the duplex mode of the scheduled entity is full-duplex-aware (FD-aware) where the scheduled entity is aware of a full-duplex slot that includes the DU symbol and selecting the DU slot interpretation further comprises selecting at least one of:

a first DU slot interpretation that causes the scheduled entity to treat all symbols, of the slot including the DU symbol, as either DL symbols or UL symbols according to a parameter preconfigured in the scheduled entity;

a second DU slot interpretation that causes the scheduled entity to treat all symbols, of the slot including the DU symbol, according to an RRC parameter;

a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol;

a fourth DU slot interpretation that causes the scheduled entity to at least one of:

treat all DU symbols, of the slot including the DU symbol, which are followed by one or more DL symbols, as DL symbols, treat all F symbols, of the slot including the DU symbol, which are followed by one or more DL symbols, and the one or more DU symbols, as DL symbols, treat all UL symbols, of the slot including the DU symbol, which are followed by one or more DU symbols, as UL symbols, or treat all F symbols, of the slot including the DU symbol, which are followed by one or more DU symbols, as UL symbols; or a fifth DU slot interpretation that causes the scheduled entity to substitute a reserved SFI, having content different from a first SFI, for the first SFI.

23. The method of claim 22 wherein the reserved SFI is indicative of the slot formatted with all DL symbols or all UL symbols.

24. A scheduled entity in a wireless communication network, comprising:
a wireless transceiver;
a memory; and
a processor communicatively coupled to the wireless transceiver and the memory, wherein the processor and the memory are configured to:
receive a message, indicating that a full-duplex slot is formatted with a downlink-uplink (DU) symbol reserved for a downlink transmission and an uplink transmission;
select a DU slot interpretation to be applied to the full-duplex slot including the DU symbol based on a duplex mode of the scheduled entity; and
apply the DU slot interpretation to the full-duplex slot, wherein the DU symbol is configured to include the downlink transmission and the uplink transmission within a same carrier bandwidth in an operating band designated for time division duplex half-duplex (TDD HD) operation.

25. The scheduled entity of claim 24, wherein the processor and the memory are further configured to:
receive a first value indicative of the DU slot interpretation to be applied to the slot including the DU symbol prior to selecting the DU slot interpretation.

26. The scheduled entity of claim 24, wherein the uplink transmission and the downlink transmission overlap partially or fully within the carrier bandwidth within the DU symbol.

27. The scheduled entity of claim 24, wherein the downlink transmission and the uplink transmission occur at a same time at different non-overlapping frequencies within the DU symbol.

28. The scheduled entity of claim 24, wherein the duplex mode of the scheduled entity is half-duplex (HD), and to select the DU slot interpretation, the processor and the memory are further configured to select at least one of:
a first DU slot interpretation that causes the scheduled entity to treat a first slot format indicator (SFI), comprising slot information for the slot including the DU symbol, as an error;
a second DU slot interpretation that causes the scheduled entity to treat each DU symbol, in the slot including the DU symbol, as a flexible (F) symbol;
a third DU slot interpretation that causes the scheduled entity to treat each DU symbol, in the slot including the DU symbol, as a downlink (DL) symbol;
a fourth DU slot interpretation that causes the scheduled entity to at least one of:
treat all DU symbols, in the slot including the DU symbol, which are followed by one or more DL symbols, as DL symbols,
treat all F symbols, in the slot including the DU symbol, which are followed by one or more DL symbols, as DL symbols,
treat all UL symbols, in the slot including the DU symbol, which are followed by one or more DU symbols, as UL symbols, or
treat all F symbols, in the slot including the DU symbol, which are followed by one or more DU symbols as UL symbols; or
a fifth DU slot interpretation that causes the scheduled entity to substitute a reserved SFI, having content different from the first SFI, for the first SFI.

29. The scheduled entity of claim 28, wherein the reserved SFI is indicative of the slot formatted with all DL symbols or all UL symbols.

30. The scheduled entity of claim 24, wherein the duplex mode of the scheduled entity is full-duplex-aware (FD-aware) where the scheduled entity is aware of a full-duplex slot that includes the DU symbol, and to select the DU slot interpretation, the processor and the memory are further configured to select at least one of:
a first DU slot interpretation that causes the scheduled entity to treat all symbols, of the slot including the DU symbol, as either DL symbols or UL symbols according to a parameter preconfigured in the scheduled entity;
a second DU slot interpretation that causes the scheduled entity to treat all symbols, of the slot including the DU symbol, according to an RRC parameter;
a third DU slot interpretation that causes the scheduled entity to treat all symbols, of the slot including the DU symbol, as flexible (F) symbols, wherein a physical downlink control channel (PDCCH) determines whether an F symbol is treated as an uplink (UL) symbol or a downlink (DL) symbol;
a fourth DU slot interpretation that causes the scheduled entity to at least one of:
treat all DU symbols, of the slot including the DU symbol, which are followed by one or more DL symbols, as DL symbols,
treat all F symbols, of the slot including the DU symbol, which are followed by one or more DL symbols, and the one or more DU symbols, as DL symbols,
treat all UL symbols, of the slot including the DU symbol, which are followed by one or more DU symbols, as UL symbols, or
treat all F symbols, of the slot including the DU symbol, which are followed by one or more DU symbols, as UL symbols; or
a fifth DU slot interpretation that causes the scheduled entity to substitute a reserved SFI, having content different from a first SFI, for the first SFI.

* * * * *